(12) United States Patent  (10) Patent No.: US 12,366,867 B2
Kessler  (45) Date of Patent: Jul. 22, 2025

(54) VEHICLE CONTROL SCHEMES FOR AUTONOMOUS VEHICLE SYSTEM

(71) Applicant: GLYDWAYS INC., South San Francisco, CA (US)

(72) Inventor: Patrick Kessler, San Francisco, CA (US)

(73) Assignee: Glydways Inc., South San Francisco, CA (US)

( * ) Notice: Subject to any disclaimer, the term of this patent is extended or adjusted under 35 U.S.C. 154(b) by 0 days.

(21) Appl. No.: 18/673,239

(22) Filed: May 23, 2024

(65) Prior Publication Data

US 2024/0310859 A1  Sep. 19, 2024

Related U.S. Application Data

(63) Continuation of application No. 17/206,432, filed on Mar. 19, 2021, now Pat. No. 12,019,454.

(60) Provisional application No. 62/992,739, filed on Mar. 20, 2020.

(51) Int. Cl.
  G05D 1/695  (2024.01)
  G05D 1/227  (2024.01)
  G05D 1/81  (2024.01)

(52) U.S. Cl.
  CPC ............. *G05D 1/695* (2024.01); *G05D 1/227* (2024.01); *G05D 1/81* (2024.01)

(58) Field of Classification Search
  None
  See application file for complete search history.

(56) References Cited

U.S. PATENT DOCUMENTS

| 4,018,410 | A | 4/1977 | Renaux |
| 5,063,857 | A | 11/1991 | Kissel |
| 6,163,755 | A | 12/2000 | Peer |
| 6,169,954 | B1 | 1/2001 | McCrary |
| 6,517,089 | B2 | 2/2003 | Phillis et al. |

(Continued)

FOREIGN PATENT DOCUMENTS

| CN | 101395647 | 3/2009 |
| CN | 103309350 | 9/2013 |

(Continued)

OTHER PUBLICATIONS

"Automated Road Vehicles," presented by R.E. Johnson Consulting.
(Continued)

*Primary Examiner* — Amelia Vorce
(74) *Attorney, Agent, or Firm* — Brownstein Hyatt Farber Schreck, LLP

(57) ABSTRACT

A method of navigating a plurality of vehicles along a roadway includes, at a first vehicle, navigating along a section of a roadway by following a first moving position-target, the first moving position-target determined in accordance with a first tracking function defining position along the section of the roadway as a function of time, and at a second vehicle, navigating along the section of the roadway by following a second moving position-target, the second moving position-target determined in accordance with a second tracking function defining position along the section of the roadway as a function of time. A distance between the first vehicle and the second vehicle may change as the first vehicle and the second vehicle navigate along the section of the roadway.

20 Claims, 11 Drawing Sheets

(56) References Cited

U.S. PATENT DOCUMENTS

| | | |
|---|---|---|
| 6,697,730 B2 | 2/2004 | Dickerson |
| 6,799,097 B2 | 9/2004 | Villarreal et al. |
| 6,810,817 B1 | 11/2004 | James |
| 6,923,124 B2 | 8/2005 | Roane |
| 7,317,987 B2 | 1/2008 | Nahla |
| 7,840,427 B2 | 11/2010 | O'Sullivan |
| 7,953,618 B2 | 5/2011 | Pearce et al. |
| 8,006,625 B2 | 8/2011 | Yang |
| 8,483,895 B1 | 7/2013 | Beregi |
| 8,682,511 B2 | 3/2014 | Andreasson |
| 8,720,345 B1 | 5/2014 | English |
| 8,783,626 B2 | 7/2014 | Cross |
| 8,825,255 B2 | 9/2014 | Boss et al. |
| 8,965,677 B2 | 2/2015 | Breed |
| 9,020,154 B2 | 4/2015 | Modica |
| 9,031,791 B2 | 5/2015 | Nedilko |
| 9,037,388 B2 | 5/2015 | McCrary |
| 9,087,314 B2 | 7/2015 | Hoffman |
| 9,165,470 B2 | 10/2015 | Mudalige |
| 9,355,319 B2 | 5/2016 | Jang |
| 9,377,315 B2 | 6/2016 | Grover et al. |
| 9,432,929 B1 | 8/2016 | Ross |
| 9,488,493 B2 | 11/2016 | MacNeille |
| 9,519,921 B2 | 12/2016 | Wei et al. |
| 9,552,564 B1 | 1/2017 | Martenis |
| 9,582,003 B1 | 2/2017 | Levandowski et al. |
| 9,603,158 B1 | 3/2017 | Ross et al. |
| 9,616,896 B1 | 4/2017 | Letwin et al. |
| 9,672,446 B1 | 6/2017 | Vallespi-Gonzalea |
| 9,715,233 B1 | 7/2017 | Mandeville-Clarke et al. |
| 9,733,096 B2 | 8/2017 | Colijn |
| 9,740,205 B2 | 8/2017 | Ross et al. |
| 9,754,490 B2 | 9/2017 | Kentley |
| 9,799,221 B2 | 10/2017 | Baller |
| 9,805,605 B2 | 10/2017 | Ramanujam |
| 9,542,852 B2 | 11/2017 | Cross |
| 9,811,086 B1 | 11/2017 | Poeppel et al. |
| 9,811,091 B2 | 11/2017 | Dolgov |
| 9,840,256 B1 | 12/2017 | Valois |
| 9,841,763 B1 | 12/2017 | Valois |
| 9,857,191 B2 | 1/2018 | Mason et al. |
| 9,884,631 B2 | 2/2018 | James |
| 10,089,537 B2 | 10/2018 | Nix |
| 10,234,863 B2 | 3/2019 | Ross |
| 10,345,805 B2 | 7/2019 | Seally |
| 10,351,137 B2 | 7/2019 | Marden |
| 10,359,783 B2 | 7/2019 | Kessler |
| 10,467,915 B2 | 11/2019 | Kessler |
| 10,613,550 B2 | 4/2020 | Khosla |
| 10,712,742 B2 | 7/2020 | Valois |
| 10,775,788 B2 | 9/2020 | Kim et al. |
| 11,169,538 B2 | 11/2021 | Williams et al. |
| 11,427,237 B2 | 8/2022 | Khosla |
| 11,532,167 B2 | 12/2022 | Gier et al. |
| 11,592,836 B2 | 2/2023 | Williams et al. |
| 2004/0225421 A1 | 11/2004 | Wu |
| 2004/0260470 A1 | 12/2004 | Rast |
| 2008/0195428 A1 | 8/2008 | O'Sullivan |
| 2009/0160678 A1 | 6/2009 | Shackleton |
| 2011/0224892 A1 | 9/2011 | Speiser |
| 2012/0083964 A1 | 4/2012 | Montemerlo |
| 2013/0073327 A1 | 3/2013 | Edelberg |
| 2013/0080040 A1 | 3/2013 | Kumabe |
| 2013/0125778 A1 | 5/2013 | LaCabe |
| 2013/0158845 A1 | 6/2013 | Davis |
| 2014/0067489 A1 | 3/2014 | James |
| 2014/0088872 A1 | 3/2014 | Linde et al. |
| 2014/0172727 A1 | 6/2014 | Abhyanker |
| 2014/0214255 A1 | 7/2014 | Dolgov |
| 2014/0309885 A1 | 10/2014 | Ricci |
| 2015/0123823 A1 | 5/2015 | Barnes |
| 2015/0149019 A1 | 5/2015 | Pilutti |
| 2015/0198459 A1 | 7/2015 | MacNeille et al. |
| 2015/0338852 A1 | 11/2015 | Ramanujam |
| 2015/0339928 A1 | 11/2015 | Ramanujam |
| 2016/0009279 A1 | 1/2016 | Jimaa et al. |
| 2016/0027307 A1 | 1/2016 | Abhyanker |
| 2016/0163200 A1 | 2/2016 | He |
| 2016/0189067 A1 | 6/2016 | Law et al. |
| 2016/0189098 A1 | 6/2016 | Beaurepaire et al. |
| 2016/0231746 A1 | 8/2016 | Hazelton |
| 2016/0334797 A1 | 11/2016 | Ross |
| 2017/0115125 A1 | 4/2017 | Outwater et al. |
| 2017/0123421 A1 | 5/2017 | Kentley |
| 2017/0123428 A1 | 5/2017 | Levinson |
| 2017/0126810 A1 | 5/2017 | Kentley |
| 2017/0227972 A1 | 8/2017 | Sabau |
| 2018/0074506 A1 | 3/2018 | Branson |
| 2018/0075738 A1 | 3/2018 | Van Egmond |
| 2018/0095465 A1 | 4/2018 | Gao |
| 2018/0105175 A1 | 4/2018 | Muller |
| 2018/0137763 A1 | 5/2018 | Deragården et al. |
| 2018/0144640 A1 | 5/2018 | Price et al. |
| 2018/0188745 A1* | 7/2018 | Pilkington ............... G08G 1/22 |
| 2018/0259976 A1 | 9/2018 | Williams et al. |
| 2018/0275648 A1 | 9/2018 | Ramalingam |
| 2018/0313661 A1 | 11/2018 | Eyster et al. |
| 2018/0342033 A1 | 11/2018 | Kislovskiy |
| 2018/0342034 A1 | 11/2018 | Kislovskiy |
| 2018/0357912 A1 | 12/2018 | Kessler |
| 2019/0018411 A1 | 1/2019 | Herbach |
| 2019/0025819 A1 | 1/2019 | Ferguson et al. |
| 2019/0163204 A1 | 5/2019 | Bai |
| 2019/0179338 A1* | 6/2019 | Kim ..................... B60W 30/17 |
| 2019/0197798 A1 | 6/2019 | Abari |
| 2019/0220037 A1 | 7/2019 | Vladimerou et al. |
| 2019/0250637 A1 | 8/2019 | Khosla |
| 2019/0285425 A1 | 9/2019 | Ludwick et al. |
| 2019/0286163 A1 | 9/2019 | Yasuda et al. |
| 2019/0339712 A1 | 11/2019 | Kessler |
| 2019/0349563 A1 | 11/2019 | Mesher |
| 2020/0023811 A1 | 1/2020 | Herman et al. |
| 2020/0126428 A1 | 4/2020 | Tonosaki |
| 2020/0164887 A1 | 5/2020 | Yamashita |
| 2020/0198678 A1 | 6/2020 | Khosla |
| 2020/0216069 A1* | 7/2020 | Elflein ............... B60W 50/0097 |
| 2020/0257312 A1 | 8/2020 | Suzuki et al. |
| 2020/0298882 A1* | 9/2020 | Kobayashi ............ B60W 40/04 |
| 2021/0042670 A1 | 2/2021 | Hirose et al. |
| 2021/0049900 A1 | 2/2021 | Chang |
| 2021/0163000 A1 | 6/2021 | Dieckmann et al. |
| 2021/0192452 A1 | 6/2021 | Murray et al. |
| 2021/0213938 A1 | 7/2021 | Watanabe et al. |
| 2021/0213948 A1 | 7/2021 | Lahti et al. |
| 2021/0294352 A1 | 9/2021 | Kessler et al. |
| 2021/0327275 A1 | 10/2021 | Sambale et al. |
| 2021/0335134 A1 | 10/2021 | Park et al. |
| 2021/0362759 A1 | 11/2021 | Khosla |
| 2021/0370855 A1* | 12/2021 | Higgins-Luthman ....................... G06V 40/10 |
| 2022/0051568 A1 | 2/2022 | Kessler |
| 2022/0253074 A1 | 8/2022 | Williams |
| 2022/0348225 A1* | 11/2022 | Kumano ........... B60W 60/0015 |
| 2023/0205227 A1 | 6/2023 | Williams et al. |
| 2024/0149917 A1 | 5/2024 | Flynn et al. |
| 2024/0310839 A1 | 9/2024 | Williams et al. |
| 2024/0310840 A1 | 9/2024 | Williams et al. |
| 2024/0319749 A1 | 9/2024 | Williams et al. |

FOREIGN PATENT DOCUMENTS

| | | |
|---|---|---|
| CN | 103492968 | 1/2014 |
| CN | 104007764 | 8/2014 |
| CN | 105446343 | 3/2016 |
| CN | 111868776 | 10/2020 |
| DE | 102017119709 | 3/2018 |
| DE | 102020125470 | 4/2021 |
| EP | 2942250 | 11/2015 |
| EP | 3340203 | 6/2018 |
| JP | 2015114744 | 6/2015 |
| JP | 2017035927 | 2/2017 |
| JP | 2019510674 | 4/2019 |
| JP | 2019519851 | 7/2019 |
| JP | 7063172 | 5/2022 |

(56) References Cited

FOREIGN PATENT DOCUMENTS

| | | |
|---|---|---|
| KR | 20160066854 | 6/2016 |
| WO | WO2016183525 | 11/2016 |
| WO | WO2017223031 | 12/2017 |
| WO | WO2018/160724 | 9/2018 |
| WO | WO2018/227107 | 12/2018 |
| WO | WO2019/178197 | 9/2019 |
| WO | WO 2019/243885 | 12/2019 |
| WO | WO2020/026761 | 2/2020 |
| WO | WO2021/188872 | 9/2021 |
| WO | WO2021/238283 | 12/2021 |
| WO | WO2022/035901 | 2/2022 |

OTHER PUBLICATIONS

Auto Connected Car News, posted Lynn Walford, posted Sep. 2014.
"Can Frisco's new fleet of autonomous vehicles help people get used to idea of a driverless future?", Melissa Repko.
EasyMile EZ1, from Wikipedia.
Evaluation of Automated Vehicle Technology for Transit—2016 Update, Final Report, Apr. 2016.
"Chevrolet's Shanghai EN-V 2.0 Carsharing Program is a Hit," May 24, 2017, by Steve Hanley.
NREL, "Automated Vehicles in Public Transit Service", 5th Automated Vehicles Symposium Transit and Shared Mobility Breakout Session, Stanley E. Young & Peter Muller Jul. 17, 2016.
"What is Autotren?", http://www.modutram.com/eng/.
7Starlake, Driverless Shuttle, EZ10, May 12, 2017.
At @ MCS @ TU/e, overview of automotive technology (AT) activities within the department of Mathematics:and Computer Science (MCS) of the Endhoven University of Technology.
CuberCars2 Project—Contract No. 028062, Information Society Technology, Feb. 22, 2009.
Amditis, Automated Road Transport Systems in CityMobil2 project, "Cities demonstrating cybernetic mobility", www.citymobil2.eu, Oct. 2016.
"Arlington to Roll Out Milo Autonomous Shuttle Pilot Program" by Susan Schrock, posted Aug. 11, 2017.
Serban et al., "A security analysis of the ETSI ITS vehicular communications," Radboud University, Nijmegen, 2018.

* cited by examiner

VEHICLE CONTROL SCHEMES FOR AUTONOMOUS VEHICLE SYSTEM

CROSS-REFERENCE TO RELATED APPLICATION

This application is a continuation of U.S. patent application Ser. No. 17/206,432 filed Mar. 19, 2021 and titled "VEHICLE CONTROL SCHEMES FOR AUTONOMOUS VEHICLE SYSTEM," which claims the benefit of U.S. Provisional Patent Application No. 62/992,739, filed Mar. 20, 2020, and titled "VEHICLE CONTROL SCHEMES FOR AUTONOMOUS VEHICLE SYSTEM," the disclosures of which are hereby incorporated herein by reference in their entirety.

FIELD

The described embodiments relate generally to vehicles, and, more particularly, to vehicle control schemes for controlling the operation of autonomous vehicles along a roadway.

BACKGROUND

Vehicles, such as cars, trucks, vans, busses, trams, and the like, are ubiquitous in modern society. Cars, trucks, and vans are frequently used for personal transportation to transport relatively small numbers of passengers, while busses, trams, and other large vehicles are frequently used for public transportation. Vehicles may also be used for package transport or other purposes. Such vehicles may be driven on roads, which may include surface roads, bridges, highways, overpasses, or other types of vehicle rights-of-way. Driverless or autonomous vehicles may relieve individuals of the need to manually operate the vehicles for their transportation needs.

SUMMARY

A method of navigating a plurality of vehicles along a roadway may include, at a first vehicle, navigating along a section of a roadway by following a first moving position-target, the first moving position-target determined in accordance with a first tracking function defining position along the section of the roadway as a function of time, and at a second vehicle, navigating along the section of the roadway by following a second moving position-target, the second moving position-target determined in accordance with a second tracking function defining position along the section of the roadway as a function of time. A distance between the first vehicle and the second vehicle may change as the first vehicle and the second vehicle navigate along the section of the roadway. A time interval between the first vehicle and the second vehicle may be maintained above an established minimum value.

A time interval between the first vehicle and the second vehicle may remain constant as the first vehicle and the second vehicle navigate along the section of the roadway. The time interval between the first vehicle and the second vehicle at a given time may be defined by the first tracking function and the second tracking function, and the distance between the first vehicle and the second vehicle at the given time may be defined by the first tracking function and the second tracking function.

The first vehicle may calculate the first moving position-target as the first vehicle navigates along the section of the roadway, and the second vehicle may calculate the second moving position-target as the second vehicle navigates along the section of the roadway. The first vehicle may include a first clock synchronized to a reference clock, the first vehicle may calculate the first moving position-target using a time from the first clock, the second vehicle may include a second clock synchronized with the reference clock, and the second vehicle may calculate the second moving position-target using a time from the second clock.

A transportation system may include a plurality of vehicles configured to autonomously navigate along a roadway by following moving position-targets defined for the roadway. The transportation system may include a vehicle presence detector configured to detect a presence or absence of a vehicle at a position upstream of a merge area of the roadway, wherein an absence of a vehicle at the position for a predetermined time indicates an available vehicle position along the roadway. The transportation system may also include a vehicle. The vehicle may include a drive system configured to propel the vehicle, a steering system configured to steer the vehicle, and a vehicle controller configured to receive, from the vehicle presence detector, information indicating the available vehicle position, in response to receiving the information indicating the available vehicle position, select a tracking function, from a plurality of candidate tracking functions, that is associated with the available vehicle position, cause the drive system and the steering system to merge the vehicle onto the roadway at the available vehicle position, and cause the drive system and the steering system to navigate the vehicle along the roadway in accordance with the selected tracking function.

At least two of the plurality of candidate tracking functions may define a variable distance between two vehicles and a constant time interval between the two vehicles along the roadway. The vehicle presence detector may wirelessly communicate with the vehicle to send the information indicating the available vehicle position. The information indicating the available vehicle position may include coordinates of the available vehicle position and a time.

The operation of selecting the tracking function may include selecting a tracking function that correlates the available vehicle position to a time at which the available vehicle position was detected. The vehicle controller may further include a first clock that is synchronized to a reference clock, and the vehicle presence detector may include a second clock that is synchronized to the reference clock.

The transportation system may further include a plurality of additional vehicles navigating along the roadway, each respective additional vehicle navigating in accordance with a different respective tracking function of the plurality of candidate tracking functions. Each tracking function of the plurality of candidate tracking functions may define a position along the roadway as a function of time, and the vehicle and each respective additional vehicle may store the plurality of candidate tracking functions.

A transportation system may include a plurality of vehicles configured to autonomously navigate along a roadway having a first segment associated with a first vehicle control scheme and a second segment associated with a second vehicle control scheme. The transportation system may include a vehicle including a drive system configured to propel the vehicle, a steering system configured to steer the vehicle, and a vehicle controller. The vehicle controller may be configured to detect a transition from a first segment of a roadway to a second segment of the roadway, the first segment of the roadway associated with a platooning scheme, and the second segment of the roadway associated with a moving position-target vehicle control scheme. The vehicle controller may also be configured to determine a time at which the vehicle will enter the second segment of the roadway from the first segment of the roadway, select a tracking function, from a plurality of candidate tracking functions, that is associated with the time at which the vehicle will enter the second segment of the roadway and a location of a beginning of the second segment of the roadway, and cause the drive system and the steering system to navigate the vehicle along the second segment of the roadway in accordance with the selected tracking function.

The vehicle may be a first vehicle, and the vehicle controller may be further configured to, prior to entering the second segment of the roadway, navigate the first vehicle along the first segment of the roadway according to the platooning scheme. Navigating the first vehicle according to the platooning scheme may include detecting a change in a speed of a second vehicle that is ahead of the first vehicle, and changing a speed of the first vehicle in response to detecting the change in speed of the second vehicle.

The vehicle controller may use closed-loop position control to maintain the vehicle at a position indicated by the selected tracking function. The vehicle may store information indicating a location of the transition from the first segment of the roadway to the second segment of the roadway, and the vehicle controller may detect the transition from the first segment of the roadway to the second segment of the roadway based at least in part on a location of the vehicle and the stored information indicating the location of the transition.

The transportation system may further include a detectable component indicating the transition from the first segment of the roadway to the second segment of the roadway, the vehicle may include a sensor, and the operation of detecting the transition from the first segment of the roadway to the second segment of the roadway may include detecting the detectable component with the sensor. The detectable component may be embedded in the roadway.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
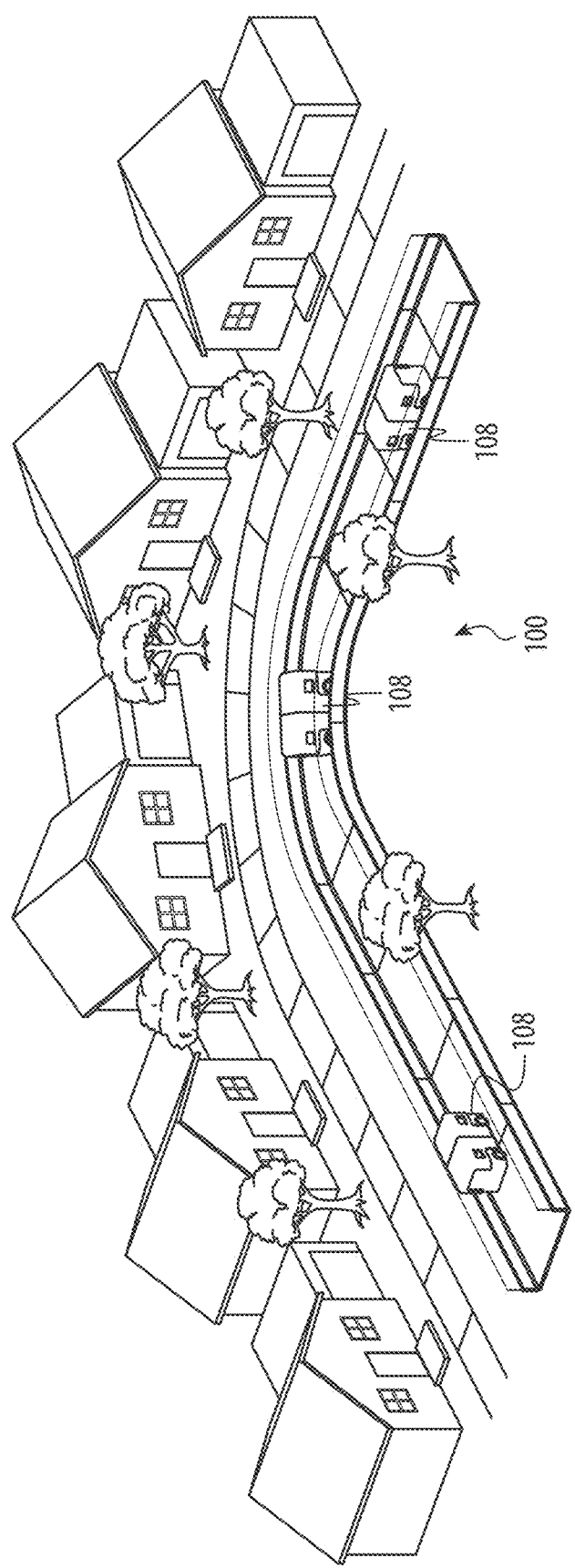
FIG. 1 depicts a portion of an example roadway.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a transportation system in which numerous vehicles may be autonomously operated to transport passengers and/or freight along a roadway. For example, a transportation system or service may provide a fleet of vehicles that operate along a roadway to pick up and drop off passengers at either pre-set locations or stops, or at dynamically selected locations (e.g., selected by a person via a smartphone). As used herein, the term "roadway" may refer to a structure that supports moving vehicles.

Autonomous operation of a vehicle is a complicated task, however, and the particular techniques or schemes employed by the vehicles on the roadway may have a dramatic effect on the operation of the overall system, as well as the cars individually. For example, some vehicle control schemes may be susceptible to causing or propagating traffic jams or other disturbances that negatively affect the operation and/or efficiency of the system. Accordingly, establishing an appropriate vehicle control scheme (or schemes) for a roadway may help ensure smooth and efficient operation of the system.

One example vehicle control scheme described herein establishes virtual position targets (referred to herein as moving position-targets or simply as position targets) that move along a roadway and act as targets (or position setpoints) for the autonomous vehicles. When a vehicle is traveling along a roadway segment that utilizes this type of control scheme, the vehicle may be assigned to or otherwise associated with a particular moving position-target, and the vehicle may adjust its speed and/or heading to minimize the error between its actual position and the position of the moving position-target. Each vehicle that is on that roadway segment may be assigned to or otherwise associated with a different moving position-target, and the moving position-targets may be predetermined (e.g., by a function that relates position along the roadway with time) so that the vehicles maintain a safe distance from one another. In this way, the locations of individual vehicles on the roadway and the overall flow of vehicles along the roadway segment may be tightly controlled, thereby reducing the risk of traffic jams, collisions, or the like. As used herein, a vehicle control scheme in which vehicles navigate by following moving position-targets may be referred to as a moving position-target vehicle control scheme.

The roadways of the transportation system described herein may be large and complex, however, and may benefit from employing different vehicle control schemes along different segments of the system. For example, a first vehicle control scheme in which the vehicles are configured to autonomously form platoons or groups of multiple vehicles may be employed along some segments of the roadway, and a second vehicle control scheme, such as a moving position-target vehicle control scheme, may be employed along other segments of the roadway. Examples of such vehicle control schemes, as well as techniques for transitioning between various different vehicle control schemes at intersections, merge points, junctions, and the like, are described herein.

The transportation system described herein may include or be operated with a dedicated type of vehicle (or several dedicated types of vehicles), which may be configured to independently operate according to the particular vehicle control schemes established for particular roadway segments, and which may also be subject to being directly controlled or guided by a transportation system controller that can issue commands to or otherwise control components of the transportation system (e.g., the vehicles in the transportation system). As used herein, vehicle control schemes may be executed by the vehicles, by the transportation system controller, by a combination of the vehicles and the transportation system controller, or using any other suitable components, computers, servers, controllers, or combinations thereof.

FIG. 1 illustrates a section of roadway 100 for autonomous vehicles 108, in accordance with embodiments described herein. The section of roadway that is shown in FIG. 1 is shown at ground level, in a typical urban or suburban environment, though this is not meant to be limiting. Indeed, the roadway may be deployed in any environment or location, including rural locations, entirely or partially inside buildings, away from roadways, on elevated structures, underground, or the like. The roadway 100 is shown with a plurality of four-wheeled vehicles 108 navigating along the roadway 100. The vehicles 108 may be autonomous or semi-autonomous vehicles specifically designed for use with the roadway 100. One example type of vehicle for use with the roadway 100 is described with respect to FIGS. 7A-9B, though other types of vehicles may be driven along the roadway 100 instead of or in addition to those described herein. The roadway 100, of which the segment shown in FIG. 1 may only be a small portion, may include multiple segments including straightaways, turns, intersections, bridges, tunnels, boarding zones, parking facilities, or the like. In order to facilitate efficient vehicle operations, different vehicle control schemes may be employed at different segments. For example, a moving position-target vehicle control scheme may be employed along main thoroughfares, while platooning (or other) schemes may be employed along on-ramps, boarding zones, or the like.

Figure 2A:
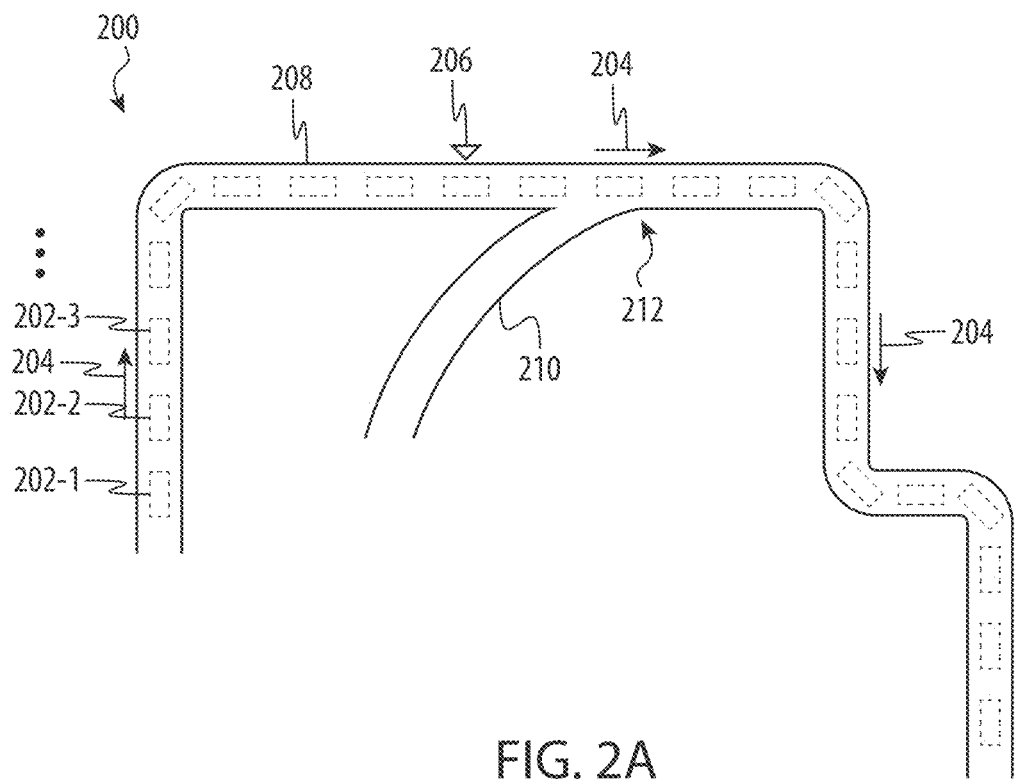
FIG. 2A depicts a portion of an example roadway that employs a moving position-target control scheme.

FIG. 2A illustrates an example portion of a roadway 200 that employs a moving position-target control scheme along at least part of the roadway 200. The portion of the roadway 200 may include a first segment 208 and a second segment 210 that merges with the first segment 208 at a merge area 212. The first segment 208 may be associated with a moving position-target control scheme, while the second segment 210 may be associated with a moving position-target control scheme, a platooning scheme, or any other suitable vehicle control scheme.

In a moving position-target control scheme, vehicles on the roadway are configured to follow virtual position targets 202 (e.g., 202-1, ..., 202-n) that move, virtually, along the roadway 200. For example, the virtual position targets 202 (also referred to herein simply as position targets) may be conceptualized as virtual containers that move along the roadway and that the vehicles will attempt to remain "in" as they navigate along the roadway. In this way, the manner in which the position targets 202 move along the roadway may be predefined for the roadway, and any vehicle that drives along the roadway in accordance with the moving position-target control scheme will move in a predictable, predetermined manner (e.g., at a position, speed, heading, etc., that is predefined by the position targets). This control scheme also helps avoid traffic jams or other unpredictable traffic conditions because the vehicles are configured to stay in the "virtual containers" that provide a predetermined vehicle flow/pattern. As shown in FIG. 2A, the position targets 202 move along a direction indicated by arrows 204.

As described herein, the position targets need not have a fixed speed or fixed separation distance over a roadway segment. Rather, such parameters may vary to accommodate various needs of the transportation system. For example, the velocity of the position targets may change (e.g., decrease) around a turn in the roadway segment, and the distance between the position targets may also change (e.g., decrease) around the turn. Even where speeds and/or following distances change in a moving position-target control scheme, the flow rate of vehicles may remain constant along that segment of roadway, thus enabling steady-state operation of the system and avoiding backups or other non-steady state conditions.

The position targets 202 may be defined in any suitable manner. For example, as described herein with respect to FIGS. 4A-4B, the position targets 202 may be defined by functions that define position along the roadway as a function of time. Each vehicle may store or otherwise have access to the functions so that they can each independently determine the locations of the position targets at a given time. In this manner, the vehicles may independently determine the position of the position target that it is attempting to follow, without requiring the position of the position target to be sent from a remote source (e.g., a remote server or controller). As another example, position targets 202 may be defined by waveforms (e.g., traveling waves), where the minima and/or maxima of the waveforms defines the position targets.

As used herein, a vehicle "following" a virtual position target refers to the vehicle attempting to maintain its position at the virtual position target (or at a fixed offset from the position target), and does not require that the vehicle be behind the position target. For example, a vehicle may "follow" the position target by using a closed-loop position controller that attempts to minimize an error between the vehicle's actual position and the position of the position target. Thus, as the position target moves (virtually) along the roadway, the vehicle will steer and propel itself in a manner that causes the vehicle to remain largely coincident with the position target. As would be expected in a closed-loop position control, the actual position of the vehicle may deviate slightly from the setpoint (here, the position target), and as such the actual position and the setpoint may not be exactly equal during normal operations of the system. Thus, following, tracking, or otherwise maintaining coincidence with a position target will be understood to include the potential of such incidental positional errors.

Further, the positions of the vehicle and of the virtual position targets may be defined in any suitable manner. In one example, position targets may be defined by single-dimensional points, and the position of the vehicles may correspond to single-dimensional points at a fixed location on the vehicle (e.g., at the geometric center of the vehicle, at the center of gravity of an unloaded vehicle, at a front-most point of the vehicle, or the like). In other examples, the position targets may be defined by two-dimensional shapes that correspond to the shapes of the vehicles in the transportation system, and the position of the vehicles may be defined as the perimeter or outer boundary of the vehicles. In such cases, a vehicle may be configured to follow a position target by attempting to maintain the perimeter of the vehicle within the two-dimensional shape (e.g., rectangle) of the position target. Other techniques for defining the positions of the vehicles and the position targets are also contemplated.

Figure 2B:
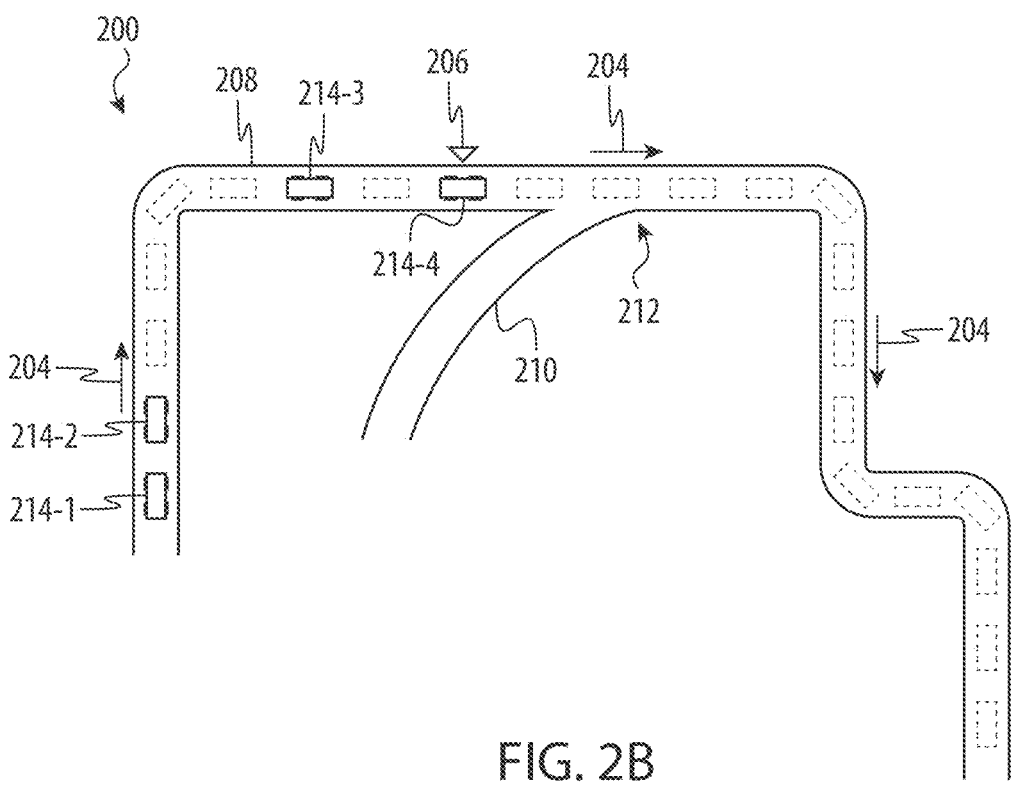
FIG. 2B depicts the portion of the roadway of FIG. 2A at a given time, illustrating example vehicle positions on the roadway.

FIG. 2B illustrates the portion of the roadway 200 at a time t0 in which vehicles 214-1, 214-2, 214-3, and 214-4 are travelling along the roadway 200. As shown in FIG. 2B, each vehicle is coincident with a respective position target (e.g., the vehicle 214-1 is coincident with the position target 202-1, the vehicle 214-2 is coincident with the position target 202-2). The vehicles may be configured to follow their respective position targets as the position targets move along the roadway 200 in the direction 204. For example, as described above, the vehicles 214 may implement a closed-loop position control scheme in which the position of the position targets 202 are used as a position setpoint for the vehicles, and the vehicles 214 follow the position targets 202 by attempting to minimize or reduce the error between the position targets and the actual position of the vehicle.

As described in greater detail herein, the position of the position targets may be absolute position coordinates (e.g., latitude and longitude coordinates), or any other suitable type of variable. In some cases, the vehicles may store a map or other representation of the roadway, and the position of the position target may be represented as a distance or length parameter. This technique may allow the vehicle to at least partially decouple steering control from speed control, thereby simplifying the operation of following the position targets. For example, the closed-loop position controller may control the speed of the vehicle (e.g., via the drive system of the vehicle), independently of the steering system, to minimize the error between the setpoint and the vehicle position. Meanwhile, the steering system may control the angle of the wheels of the vehicle (or otherwise steer the vehicle) based on where the vehicle is on the roadway and in accordance with the map of the roadway. In this way, it is not required that the closed-loop position controller calculate a novel path between its current position and its position target, because the path is already defined by the map of the roadway.

Figure 2C:
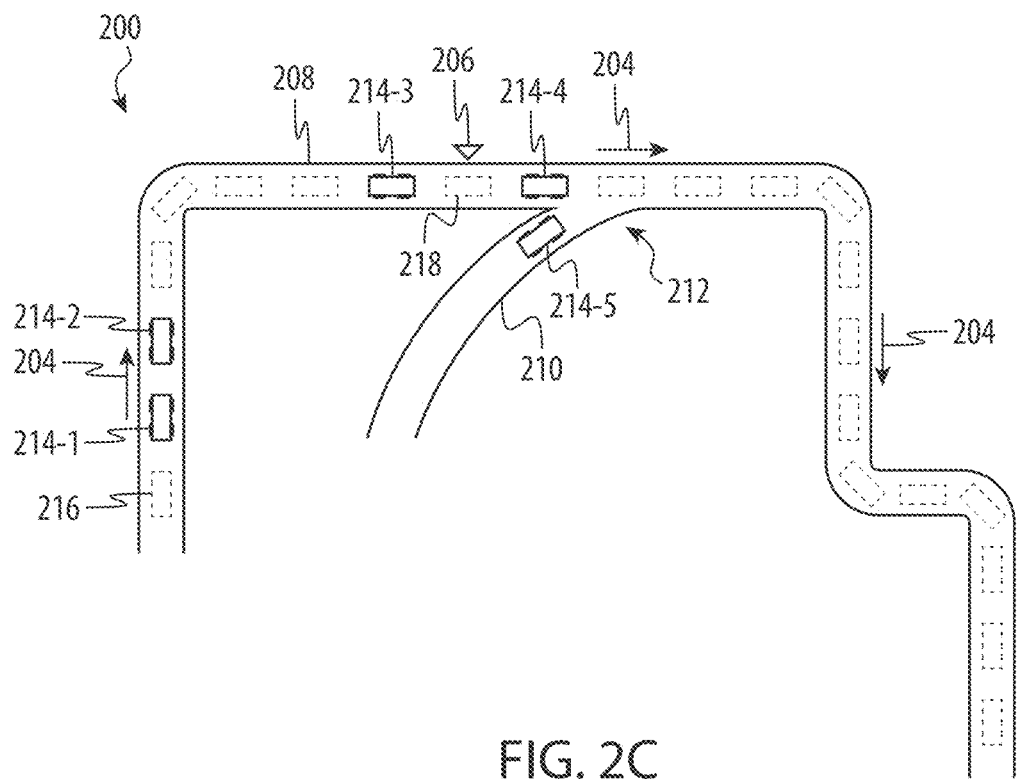
FIG. 2C depicts the portion of the roadway of FIG. 2A at another time, illustrating example vehicle positions on the roadway.

FIG. 2C illustrates the portion of the roadway 200 at a time $t_1$ in which vehicles 214-1, 214-2, 214-3, and 214-4 have advanced along the roadway in accordance with the movement of the position targets. For example, the vehicle 214-1 has advanced in concert with the position target 202-1. FIG. 2C also illustrates a new position target 216, representing the position target that is immediately behind the position target 202-1 (which is shown in FIG. 2A and is occupied by vehicle 214-1). Notably, because the vehicles are following the position targets, they do not converge on one another as they travel along the roadway. For example, the available vehicle position between the vehicles 214-3 and 214-4 (position target 218) remains available and unoccupied as the vehicles navigate along the roadway (e.g., the trailing vehicle 214-3 does not attempt to catch up to the leading vehicle 214-4, but instead remains associated with its associated position target).

FIG. 2C also shows a vehicle 214-5 on the second segment 210 of the roadway. The vehicle 214-5 may be preparing to enter into the first segment 208 of the roadway. The second segment 210 may not be associated with a moving position-target control scheme, and the vehicle 214-5 must safely merge into the first segment 208 and begin following an appropriate moving position target.

In order to merge safely, the vehicle 214-5 must select an unoccupied position target to follow (e.g., the position target 218, which is unoccupied and therefore represents an available vehicle position). Once an unoccupied position target is identified, the vehicle 214-5 may enter the first segment 208 and begin following the selected position target.

The vehicle 214-5 may determine an available vehicle position in any suitable way. In some cases, the transportation system may include vehicle presence detectors that are configured to detect a presence or absence of a vehicle on the roadway. For example, a vehicle presence detector 206 may detect when vehicles are present or absent at that location. As shown, the vehicle presence detector 206 is positioned upstream of the merge area 212. Vehicle presence information from the vehicle presence detector 206 may thus be used by vehicles attempting to merge at the merge area 212 to identify available vehicle locations. The vehicle presence detector 206 may be or include any suitable systems and/or components that can sense the presence or absence of vehicles at a position on the roadway. For example, the vehicle presence detector 206 may be or may employ optical sensors, cameras, magnetic sensors, ultrasonic sensors, weight-based sensors, or the like to determine if a vehicle is present or absent at a given location.

The vehicle presence detector 206 may send information about the presence or absence of a vehicle at that location directly to nearby vehicles and/or to an overall transportation system controller. The vehicle presence detector 206 may send or otherwise provide various types of information. For example, in some cases, the vehicle presence detector 206 sends simple presence/absence data. In such cases, the vehicles and/or a transportation system controller may then determine, using the presence/absence data, the time, and the location of the sensor, which position targets are occupied and which are unoccupied. The time and the location of the sensor may be sent by the sensor itself, or may be looked up by the receiving vehicles or computer systems using a unique identifier of the sensor (which may be sent by the sensor along with the presence/absence data). In some cases, the vehicle presence detector 206 (and/or any associated computer systems) may determine whether position targets are occupied or unoccupied, and send the occupancy status of the position targets to the vehicles and/or the transportation system controller.

While the vehicle presence detector 206 may determine the presence or absence of a vehicle at a given location, that information alone may not be sufficient to allow a vehicle, such as the vehicle 214-5, to determine whether and how it can merge into the roadway. For example, vehicles on immediately adjacent position targets have a gap between them, but there is no valid position target between them. Accordingly, it must be determined whether a gap between vehicles contains or corresponds to a valid position target, thereby constituting an available vehicle position. This determination may be made in various ways. For example, an available vehicle position may be identified in response to detecting a gap of certain distance or duration between vehicles (e.g., a gap that is sufficiently large that it would contain a valid and unoccupied position target). As another example, an available vehicle position may be identified in response to detecting an absence of a vehicle on the roadway for a predetermined time. As yet another example, an available vehicle position may be identified in response to detecting an absence of a vehicle when a known position target is passing the vehicle presence detector 206. In the foregoing examples, the operation of detecting a presence and/or absence of a vehicle may be performed using the vehicle presence detector 206, and the operation of determining whether the absence of a vehicle corresponds to or indicates an available vehicle position may be performed by the vehicle presence detector 206, one or more vehicles, a transportation system controller, or any other suitable device or system. Other techniques for determining and/or identifying an available vehicle position are also contemplated.

Where the vehicle presence detector 206 is configured to send information about available vehicle positions, and not simply presence or absence data, the vehicle presence detector 206 may store or otherwise have access to the functions that define the position targets in order to determine whether a position target is occupied or unoccupied.

In some cases, a computer system (e.g., a centralized or distributed transportation system controller) may track the locations of vehicles along the roadway, and may broadcast, to one or more vehicles in the system, the positions of vehicles on the roadway, as well as available vehicle positions on the roadway. The computer system may also assign position targets to vehicles that are entering roadway segments that employ moving position-target control schemes. The computer system may track the locations of vehicles using sensors in or along the roadway (e.g., optical sensors, cameras, magnetic sensors, ultrasonic sensors, weight-based sensors), by receiving location information from the vehicles themselves (e.g., each vehicle self-reports its location to the computer system), or using any other suitable tracking technique.

In some cases, vehicles that are on the roadway and operating under a moving position-target control scheme transmit, to other vehicles and/or a system controller of the transportation system, their own location, the position target they are following, the locations of other nearby vehicles, the presence or absence of vehicles on adjacent position targets, and the like. In some cases, such information is shared directly between vehicles. For example, with reference to FIG. 2C, the vehicle 214-4 may send information to the vehicle 214-5 indicating the position of the vehicle 214-4 and the absence of a vehicle on the position target 218.

Once an available vehicle position is identified, the merging vehicle 214-5 may select a tracking function, from a plurality of candidate tracking functions, that is associated with the available vehicle position. For example, as described herein, the available vehicle positon may correspond to a position target, and the position target may be defined by or associated with a unique tracking function that defines the position of the position target with respect to time. Accordingly, as described herein, the merging vehicle 214-5 may use information, such as a position where the available vehicle position was detected, and a time at which it was detected, to determine the tracking function that corresponds to the available vehicle position. Once the tracking function is selected (and when it is otherwise safe to do so), the merging vehicle 214-5 may merge onto the first segment 208 of the roadway at the available vehicle position. Once merged, the vehicle 214-5 navigates along the roadway in accordance with the selected tracking function.

Figure 2D:
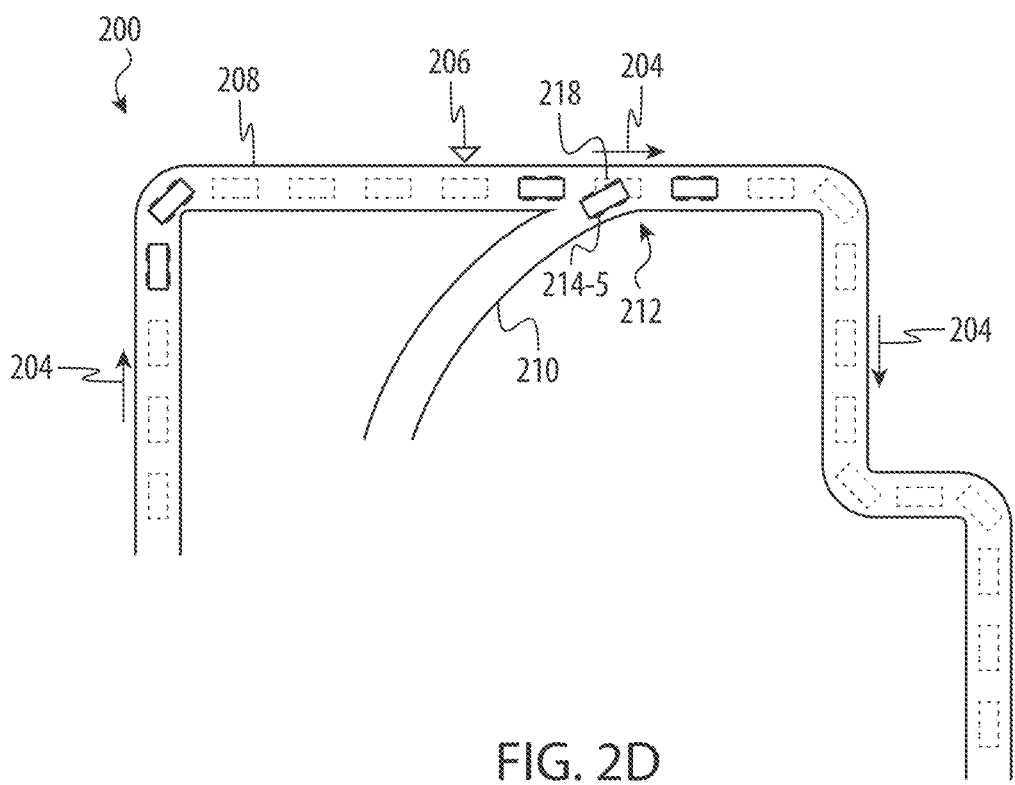
FIG. 2D depicts the portion of the roadway of FIG. 2A at yet another time, illustrating example vehicle positions on the roadway.

FIG. 2D illustrates the vehicle 214-5 as it is merging onto the first section 208 of the roadway 200 and beginning to follow the position target 218. The operation of merging onto the first section 208 as shown in FIG. 2D may include the vehicle 214-5 initiating a closed-loop position control scheme to cause the vehicle 214-5 to accelerate to the appropriate merging speed and converge on the position target 218. Steering into the first segment as part of the merging operation may be performed in a manner similar to steering along other segments of the roadway. For example, the vehicle 214-5 may store a map or other representation of the roadway (including the first segment 208 and the second segment 210), and may be configured to steer along a path that is consistent with the map and the vehicle's position. In another example, the vehicle 214-5 may determine a path (including a heading, steering angle, velocity, acceleration, or other parameter(s)) that will lead the vehicle 214-5 from its position on the second segment 210 to the position target 218 and also stay within the designated roadway boundaries.

During merging, the vehicle 214-5 may use various techniques to ensure a safe merge operation. For example, the vehicle 214-5 may determine the locations of other vehicles, the distances between itself and other vehicles, the closing speeds and/or directions of other nearby vehicles, or the like. The vehicle 214-5 may use such information to accelerate, decelerate, or change heading or position in order to maintain safe clearances, closing speeds, or the like, between itself and other vehicles during merging. The vehicle 214-5 may detect or determine such parameters using on-vehicle sensors (e.g., LIDAR, radar, ultrasonic sensors, optical sensors, cameras, infrared sensors, or the like).

A roadway for a transportation system may require various different types of junctions between roadway segments. For example, a roadway may include on-ramps, off-ramps, segments where the speeds of vehicles are to increase or decrease, areas where two traffic streams must merge together, or the like. In order to facilitate smooth and efficient operations of the system, control strategies may be defined for various types of junctions in the roadway. More particularly, the design and operation of a roadway may be facilitated by predefining how vehicles, and more specifically, moving position-target control strategies, behave at the junctions.

Figure 3A:
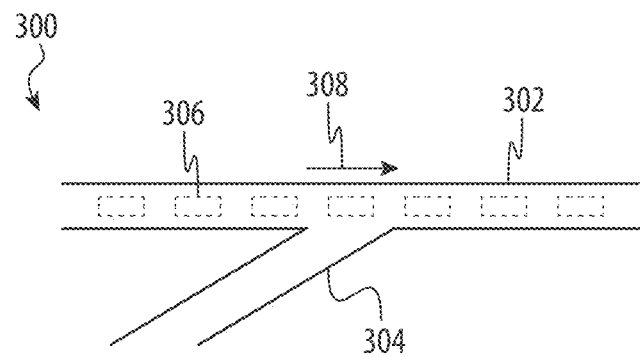
FIGS. 3A-3F depict example roadway junctions and associated vehicle control schemes.

FIGS. 3A-3F illustrate some example junctions that may be employed in a transportation system. FIG. 3A, for example, illustrates an on-ramp junction 300 in which a second segment 304 merges onto a first segment 302. The first segment 302 may be associated with a moving position-target control scheme, while the second segment 304 may be associated with a control scheme other than a moving position-target control scheme (e.g., a platooning scheme). When a vehicle encounters an on-ramp junction, the vehicles will operate according to a predetermined routine. For example, vehicles on the first segment 302 will operate according to the moving position-target control scheme (indicated by the moving position targets 306 that move in the direction 308), while vehicles on the second segment 304 will transition to the moving position-target control scheme as they merge onto the first segment 302. Because such behaviors may be predetermined, under normal operating conditions each vehicle in the system can expect the others to operate according to those behaviors.

Figure 3B:
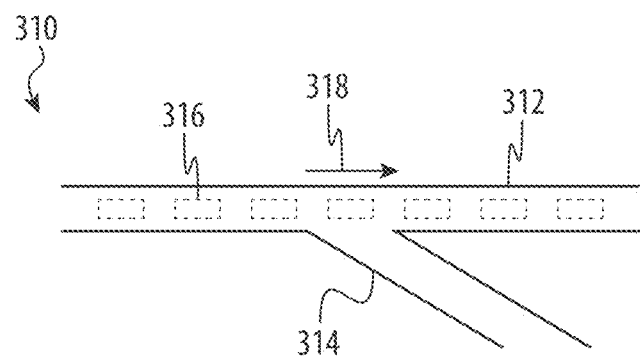

FIG. 3B illustrates an off-ramp junction 310 in which a second segment 314 merges out of a first segment 312. The first segment 312 may be associated with a moving position-target control scheme, while the second segment 314 may be associated with a control scheme other than a moving position-target control scheme (e.g., a platooning scheme). When a vehicle encounters an off-ramp junction, the vehicles will operate according to a predetermined routine. For example, vehicles on the first segment 312 will operate according to the moving position-target control scheme (indicated by the moving position targets 316 that move in the direction 318), while vehicles exiting the first segment 312 will transition from the moving position-target control scheme to a different vehicle control scheme as they exit the first segment 312 onto the second segment 314. In some cases, while they are in the process of exiting the first segment 312, the exiting vehicles may attempt to maintain the same distance between the leading and trailing vehicles until the exiting vehicles are completely out of the flow of traffic along the first segment 312.

Figure 3C:
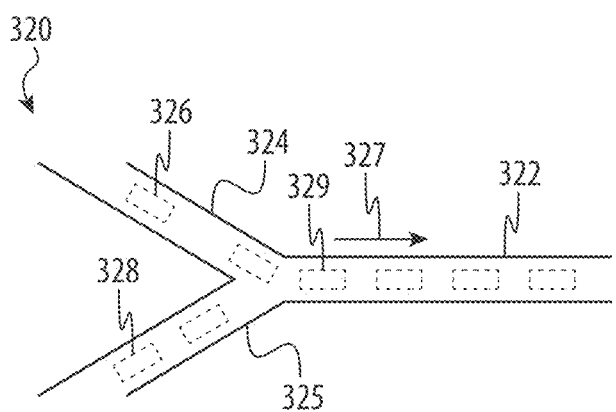

FIG. 3C illustrates a join junction 320 in which a first segment 324 joins a second segment 325, and the flow of vehicles from the first and second segments 324, 325 continue along a third segment 322 (moving in direction 327). The first, second, and third segments 324, 325, 322 may all be associated with a moving position-target control scheme. In order to join the flow of vehicles from the first and second segments 324, 325 together without causing backups or other non-steady state flow conditions, the flow rate of the third segment 322 may need to be substantially equal to the combined flow rate of the first and second segments 324, 325. Stated another way, the vehicle flow rate of the first segment 324 may be half the vehicle flow rate of the third segment 322, and the vehicle flow rate of the second segment 325 may also be half the vehicle flow rate of the third segment 322. This condition is illustrated in FIG. 3C by the first segment 324 having position targets 326 with sufficient spacing to accommodate the position targets 328 of the second segment 325. In this way, the vehicle flows of the first and second segments can merge together without backups or slowdowns. Further, the speed of the vehicles on the first and second segments 324, 325 may remain the same after the vehicle flows are joined and they are navigating along the third segment 322.

The position targets 326 and 328 may be staggered so that the position targets 326 of the first segment 324 accommodate the position targets 328 of the second segment 325 in the existing gaps between the position targets 326. Because the vehicle control schemes of all segments of the join junction 320 are predetermined, including the positions and speeds of the position targets 326, 328, and 329, continuous, uninterrupted merging of the vehicle flows may be maintained continuously (and without requiring the vehicles to significantly slow down or speed up to accomplish the merge).

Figure 3D:
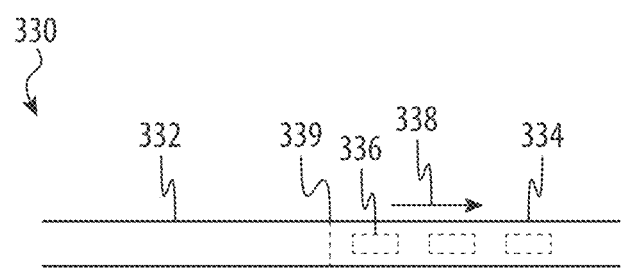
Figure 3E:
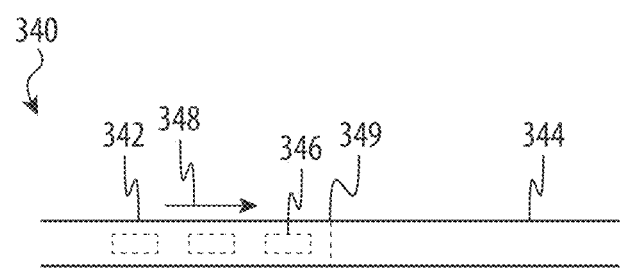
Figure 3F:
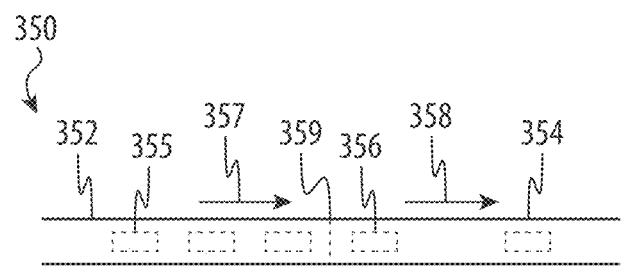

FIGS. 3D-3F illustrate transition junctions 330, 340, and 350 in which two segments having different vehicle control schemes abut one another. As the vehicles cross a border from one segment to the next in these junctions, the vehicles transition from one vehicle control scheme to another. FIG. 3D, for example, illustrates a transition junction 330 in which a first segment 332 is associated with a vehicle control scheme other than a moving position-target control scheme, and a second segment 334 is associated with a moving position-target control scheme as illustrated by the position targets 336 (moving along the roadway in direction 338). As vehicles approach the boundary 339 between the first and second segments 332, 334, they will anticipate the transition to the moving position-target control scheme. For example, in some cases, when the vehicles come within a threshold distance to the boundary 339, they determine a position target and associated tracking function that will be available and suitable at the time when they cross the boundary 339. Once they cross the boundary, they begin operating according to the moving position-target control scheme, and follow a moving position-target defined by the selected tracking function. In some cases, vehicles do not transition to the moving position-target scheme until there are no other vehicles between it and the boundary 339. If such vehicles are present, a vehicle must slow down and/or stop until those vehicles have entered the second segment. Vehicle presence detectors or other techniques (as described above) may be used to determine what position targets and/or tracking functions are available and to facilitate safe and efficient transitions to the second segment 334. The boundary between segments may be or may include a detectable component such as a detectable material in or along the roadway (e.g., a magnet, a metal, an optical signal or beacon, a sign, or the like).

FIG. 3E illustrates a transition junction 340 in which a first segment 342 is associated with a moving position-target control scheme (as illustrated by the position targets 346 moving along the roadway in direction 348), and a second segment 344 is associated with a vehicle scheme other than a moving position-target control scheme (e.g., a platooning scheme). As vehicles approach the boundary 349 between the first and second segments 342, 344, they will anticipate the transition out of the moving position-target control scheme. For example, when the vehicles cross the boundary 349, they will cease following a position target of a tracking function, and begin navigating according to a different control scheme, such as by attempting to maintain a following distance or headway behind the leading vehicle, up to a maximum speed limit.

FIG. 3F illustrates a transition junction 350 in which first and second segments 352, 354 are associated with moving position-target control schemes, but each having different vehicle motion parameters (e.g., different speeds). For example, FIG. 3F illustrates the first segment 352 with position targets 355 moving in direction 357 at a first speed, and the second segment 354 with position targets 356 moving in direction 358 at a second speed that is different than the first speed (e.g., faster). As the vehicles come within a threshold distance to the boundary 359, they determine a position target and associated tracking function that will be available and suitable at the time when they cross the boundary 359. Once they cross the boundary, they begin operating according to the second moving position-target control scheme, and follow a moving position-target defined by the selected tracking function. In order to avoid backups, traffic jams, or other non-steady state operating conditions, the vehicle control schemes of the first and second segments of the transition junction 350 (as well as other similar transition junctions) may be configured to have the same vehicle flow rate. In other cases, the vehicle flow rate may change, so long as it only increases along the downstream direction (e.g., the flow rate only ever increases as the vehicles travel along the roadway until they exit the roadway or the roadway ends).

Figure 4A:
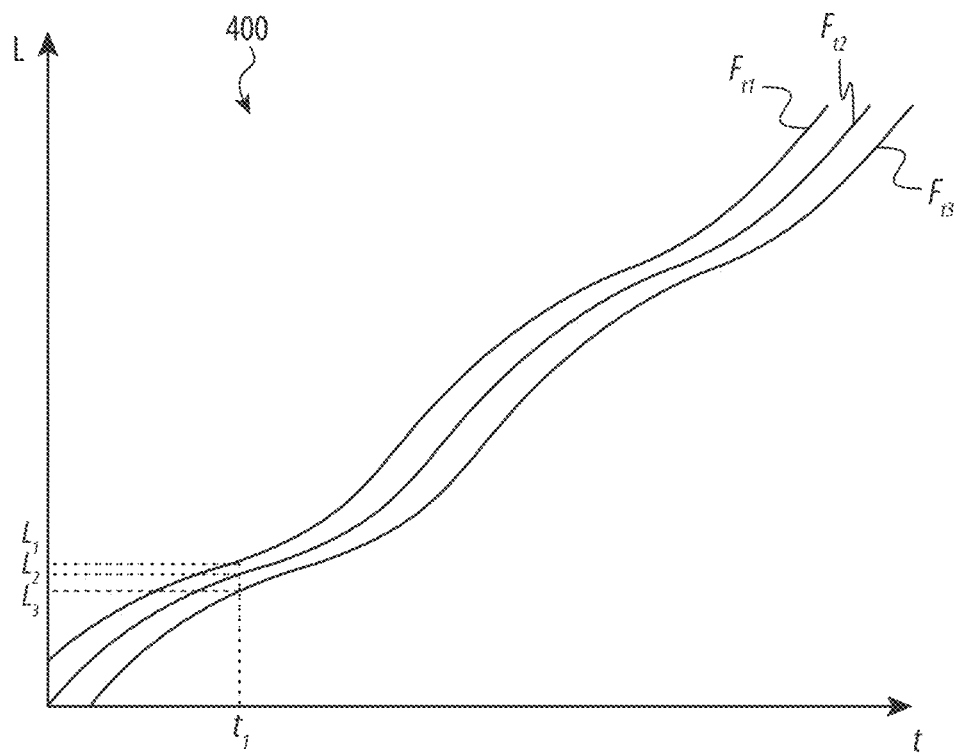
FIGS. 4A-4B depict plots of example tracking functions defining the position of a vehicle along a segment of a roadway with respect to time.
Figure 4B:
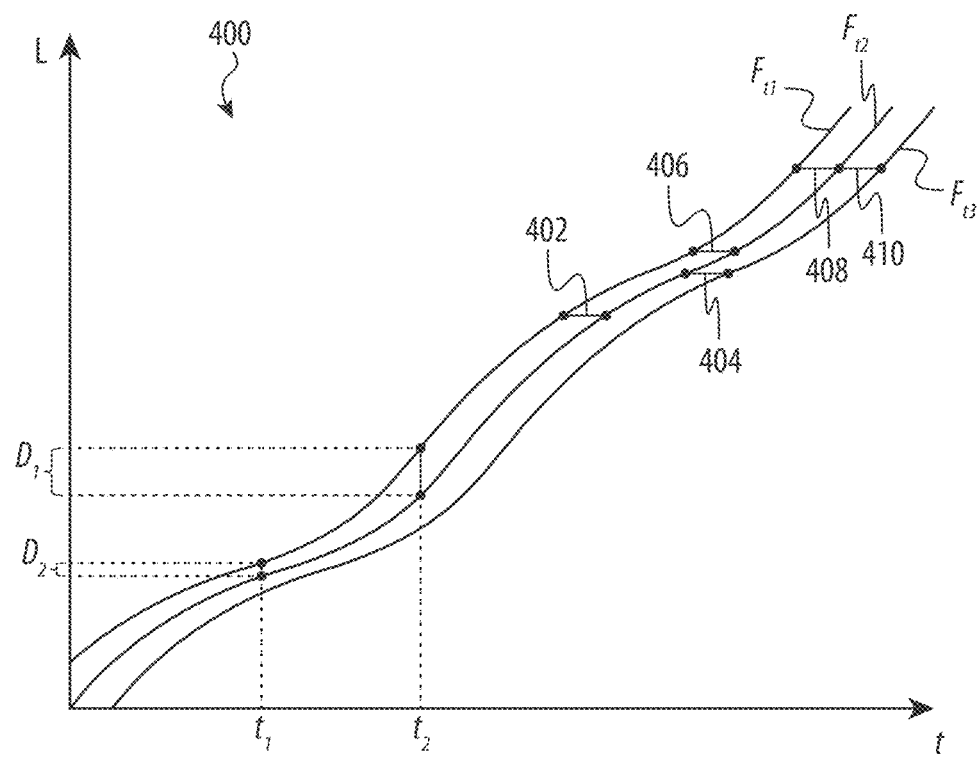

As described above, vehicles may use tracking functions in order to determine the locations of the moving position-targets that they are following. Tracking functions may be defined in numerous ways. FIGS. 4A-4B illustrate example tracking functions and how the tracking functions define the positional relationships of multiple vehicles on a roadway. As described above the vehicles may be assigned to a given tracking function. The assignment of a tracking function to a vehicle may be made by the vehicle itself, a transportation system controller, another vehicle, or in any other suitable manner.

FIG. 4A illustrates a plot 400 of length versus time along a section of a roadway. For ease of understanding, the y-axis of the plot 400 represents a length position along the roadway, rather than an absolute position (e.g., latitude and longitude coordinates). Accordingly, the plots shown in FIG. 4A may be associated with tracking functions that are used in conjunction with a map or other representation of the roadway to provide steering and acceleration instructions for the vehicles. Other types of tracking functions may also be used, such as ones that correlate absolute location to time.

The plot 400 depicts first, second, and third tracking functions $F_{t1}$, $F_{t2}$, and $F_{t3}$. The non-linearity of the tracking functions illustrates the variation in speed of the vehicles along the represented section of roadway. Thus, the tracking functions may define more complicated speed profiles than a simple constant-speed profile. This may be particularly useful in the context of a complex roadway that includes features such as turns of different radii and/or bank angle, hills, tunnels, merging zones or other roadway junctions, and the like. In such cases, constant-speed tracking functions may be unsafe and/or inefficient, as the speed of such functions would need to be set at the slowest speed required for that roadway (e.g., if a turn in a roadway required an extremely slow speed for safety purposes, a constant-speed function could not exceed that slow speed, even in segments where it was safe to do so).

The tracking functions may be predefined for a roadway segment so that each vehicle on that segment follows a discrete tracking function. In this manner, the gaps between vehicles will be defined and predetermined by the tracking functions, thus helping to avoid collisions or other interactions between vehicles. For example, at time $t_1$, a vehicle following function $F_{t1}$ will be at length position $L_1$, a vehicle following function $F_{t2}$ will be at length position $L_2$, and a vehicle following function $F_{t3}$ will be at length position $L_3$. By using the tracking functions as the input to or setpoint of a position controller (e.g., a closed-loop position controller), the vehicles can maintain their position at the position indicated by their assigned tracking function.

As described above, the tracking functions may not maintain a fixed distance between adjacent vehicles. Rather, the tracking functions may maintain a fixed time between adjacent vehicles. Stated another way, vehicles may remain, for example, two seconds apart from one another, regardless of their speed. Under these conditions, the distance between vehicles will increase as the speed increases. Defining the gap between vehicles using a fixed (or at least a predetermined) time interval, rather than a distance interval, contributes to the overall system efficiency. More particularly, a fixed distance-based interval would require selecting the largest safe gap size that was required along the roadway, ultimately leading to unnecessarily large gaps between vehicles in slower sections of the roadway. The time interval between vehicles may be maintained at or above a threshold or established minimum value for safety, as described herein.

FIG. 4B illustrates how the time interval between adjacent tracking functions may remain constant while the distance between vehicles may vary. For example, the equal lengths or sizes of the representative time intervals 402, 404, 406, 408, and 410 demonstrate that the time intervals between tracking functions may be fixed or constant over the length of the roadway (or at least a segment of the roadway). The different sizes of the distance intervals $D_1$ and $D_2$ (at times $t_1$ and $t_2$, respectively), illustrate that the distance between adjacent vehicles may change as the vehicles travel along the roadway. Stated another way, two tracking functions may define a variable distance between two vehicles as those two vehicles travel along a roadway according to the two tracking functions.

In some cases, the tracking functions for the roadway may be changed or adjusted in real-time. This may occur, for example, when there is a change in weather or roadway conditions, traffic conditions, or the like. For example, a time interval between vehicles that is safe during dry weather conditions may not be sufficient for wet weather conditions. Accordingly, the transportation system may require vehicles to modify their tracking functions in response to detecting a condition (or change in conditions) that affects the transportation system, such as a change in weather conditions, road conditions, the existence of debris, people, or other objects on the roadway, or the like. In some cases, multiple sets of tracking functions are predefined, and vehicles may be instructed (e.g., by the transportation system controller) to change from one set to another set in response to the detected condition. In other cases, the vehicles may be instructed (e.g., by the transportation system controller) to modify their existing tracking functions to increase or decrease the time intervals between the vehicles (e.g., by changing the value of a constant in the tracking functions). Other techniques for changing the tracking functions associated with a roadway are also possible.

In some cases, the transportation system has an established minimum value for the time interval between two vehicles. For example, the minimum time interval between two vehicles may be about 1 second, about 2 seconds, about 5 seconds, or any other suitable value. The established minimum time interval may be defined at least in part on the properties of the components of the transportation system, including but not limited to the braking performance of the vehicles, the available traction of the vehicles, the design of the roadway (e.g., the turn radii and road grade of the roadway, etc.), or the like. The established minimum time interval may be system-wide. In some cases, instead of or in addition to a system-wide established minimum time interval, local and/or temporary minimum time intervals may be established. For example, certain sections of a roadway may have different minimum time intervals (e.g., different sections of roadway may have different weather or road surface conditions, different roadway layouts, or the like, and thus may have different minimum time intervals). As another example, certain conditions may subject the entire system to a different minimum time interval (e.g., a system-wide weather event may cause a greater minimum established time interval to be instituted for safety or other reasons).

Changes to the tracking functions may be configured to occur at roadway junctions (e.g., when cars cross a certain boundary between roadway segments) so that the vehicles can adapt to the new tracking functions in an orderly (e.g., sequential) manner and without causing traffic jams, collisions, or other issues.

In order to ensure that all vehicles on the roadway are accurately tracking a position target, all of the vehicles must operate using a synchronized clock system. For example, if two vehicles' clocks do not have the same time, then they may not be at the correct position for their tracking functions. Accordingly, the vehicles may each include a clock that is synchronized with the clocks of other vehicles and/or a reference clock (which may be associated with a transportation system controller, a centralized server, a publicly-accessible clock service, or the like).

Figure 5:
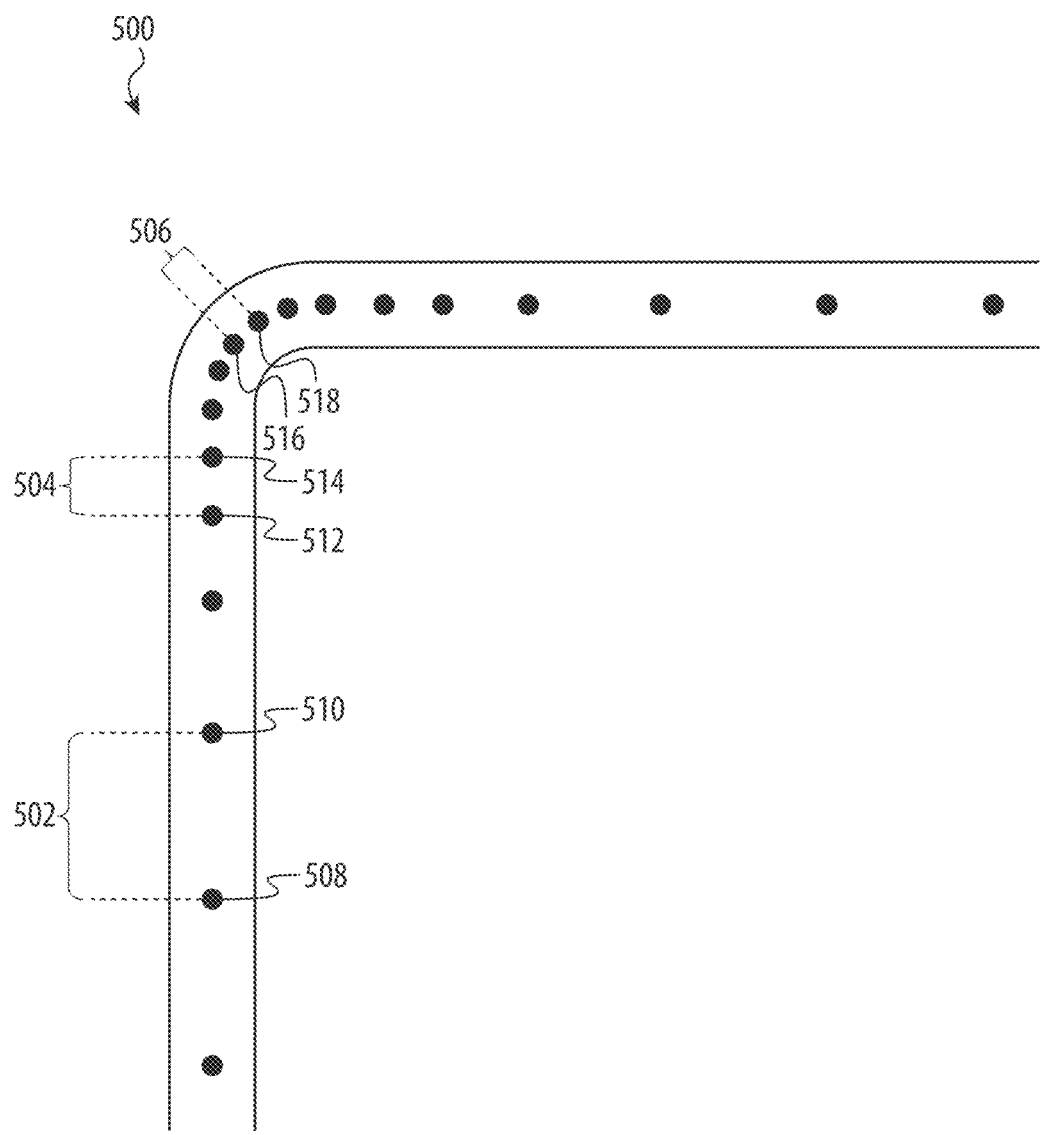
FIG. 5 depicts a portion of an example roadway, illustrating example inter-vehicle distances in a moving position-target control scheme.

FIG. 5 illustrates a segment 500 of a roadway, showing how the physical distance between vehicles may differ while the time interval between them remains constant. For example, a distance 502 between the target positions 508 and 510 may represent a two-second time interval due to the speeds of the target positions 508 and 510 at their locations along a straight portion of the roadway. As the target positions approach and enter a turn in the roadway, they may decelerate to maintain passenger comfort and/or vehicle safety during the turn. As the vehicle speed decreases, the physical distance between them can also decrease while maintaining a constant time interval. Thus, for example, the distance 504 between the target positions 512 and 514 may represent the same two-second time interval, even though the distance 504 is less than the distance 502. Similarly, the distance 506 between the target positions 516 and 518 may represent the same two-second time interval, even though the distance 506 is less than the distances 502 and 504. As the vehicles exit the corner and begin to accelerate, the physical distance between the target positions may once again increase to maintain the constant time interval therebetween. As noted above, maintaining the time interval constant allows closer packing of vehicles along a roadway, as compared to maintaining a constant physical distance, because the physical distance can be more narrowly tailored to the speeds at which the vehicles are travelling.

While a moving position-target vehicle control scheme may be used along some segments of a roadway, it may not be suitable for all segments of a roadway. For example, some segments may require the ability to handle non-steady state traffic flows. Examples may include on-ramps, where vehicles may have to wait for an available vehicle position and boarding areas where the flow of vehicles may be unpredictable and/or driven by user demands. For these or other reasons, some segments of a roadway may be configured to operate according to another vehicle control scheme, such as a platooning scheme.

In some cases, the same segment of a roadway may transition between vehicle control schemes in response to certain conditions being detected or otherwise satisfied. For example, a segment of roadway may transition from a moving position-target control scheme to a platooning scheme in response to a certain roadway condition being detected (e.g., wet or slippery conditions, debris on the roadway, unpredicted vehicular or other traffic on the roadway, or the like). If such a condition occurs, the transportation system may change the vehicle control schemes of one or more segments (e.g., transitioning from a moving position-target control scheme to a platooning control scheme).

Figure 6A:
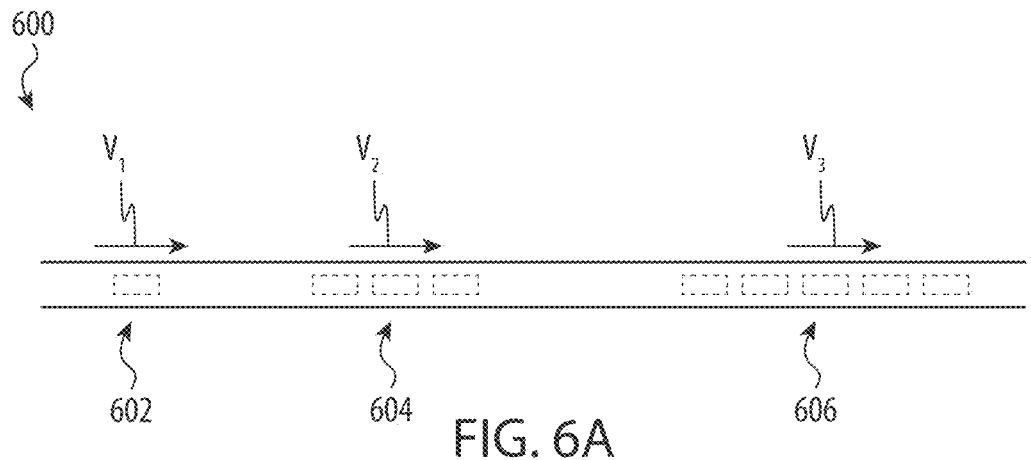
FIGS. 6A-6C depict an operation of an example platooning scheme that may be used for segments of a roadway.
Figure 6B:
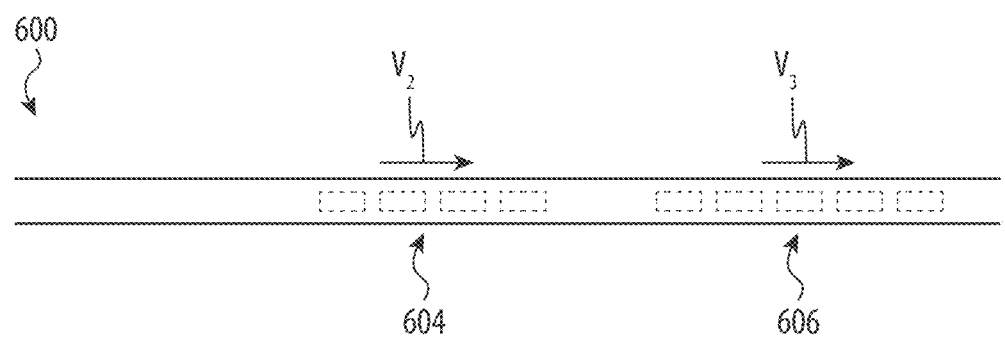
Figure 6C:
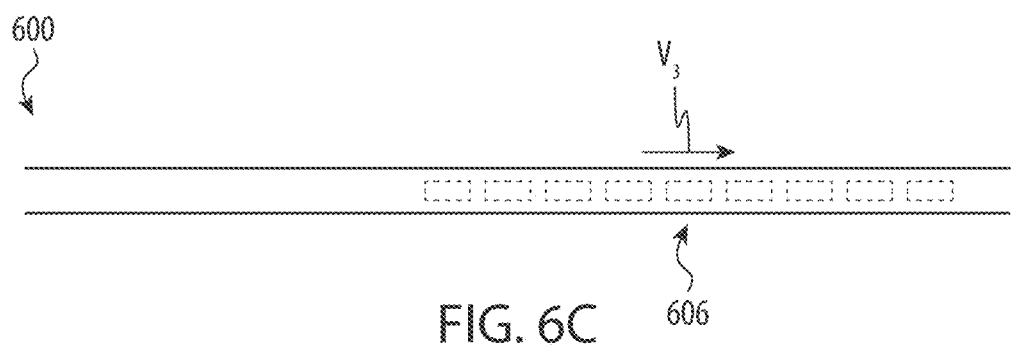

FIGS. 6A-6C depict an operation of an example platooning scheme that may be used for segments of a roadway. The platooning scheme in these figures represents a technique whereby vehicles self-organize into platoons (e.g., groups of vehicles travelling together and in which trailing vehicles react to the actions of leading vehicles). In one example, self-organization into platoons is achieved by establishing a rule whereby smaller platoons of vehicles travel faster than larger platoons. In this way, smaller platoons (including platoons of one vehicle) will always tend to decrease their separation distance to larger platoons that are further along the roadway, and will catch the larger platoons if the roadway is long enough. Further, by grouping into larger platoons, more and larger gaps will tend to form along the roadway, providing greater opportunities for other vehicles to merge into the flow of traffic.

FIG. 6A illustrates a segment 600 of a roadway with three platoons: a first platoon 602 with one vehicle, a second platoon 604 with three vehicles, and a third platoon 606 with five vehicles. FIG. 6A shows the platoons at a time to. As described above, smaller platoons may travel faster than larger platoons to allow the smaller platoons to catch up to and join the larger platoons. Accordingly, the first, second, and third platoons may travel at velocities (e.g., speeds) $V_1$, $V_2$, and $V_3$, respectively, where $V_1$ is greater than $V_2$, and $V_2$ is greater than $V_3$.

FIG. 6B illustrates the segment 600 of the roadway at time $t_1$, showing how the relative velocities of the platoons have caused the first platoon 602 to catch and join the second platoon 604. Once joined, the first platoon 602 changes its speed to match that of the second platoon 604 (e.g., $V_2$). FIG. 6B also illustrates the second platoon 604 having reduced its distance to the third platoon 606 due to the greater speed of $V_2$. FIG. 6C shows the segment 600 of the roadway at $t_2$, showing how the second platoon 604 has caught and joined the third platoon 606. Once it has joined, all of the vehicles travel according to the speed $V_3$ of the third platoon 606.

In one example, the speed of a platoon having n number of vehicles may be defined by the equation:

$$v(n) = v_{max} - \frac{n-1}{10}(v_{max} - v_{min})$$

where $v_{min}$ is an established minimum allowable speed defined for the segment of the roadway (and optionally for the entire roadway), and $v_{max}$ is a maximum allowable speed defined for the segment of the roadway (and optionally the entire roadway). The values of $v_{max}$ and $v_{min}$ may be established for the roadway based on safety considerations, roadway configuration, vehicle capabilities, and the like. It will be understood that a vehicle may decelerate to below $v_{min}$ during certain maneuvers, such as when accelerating from a stop when merging onto a roadway, when decelerating in order to exit a roadway, in emergency situations, or the like.

The above equation may apply only to vehicles having a platoon size of a given number of vehicles, while larger platoons travel at a different speed (which may be set at a particular value or defined by a different equation or set of considerations). In some cases, the above equation applies to platoons having five or fewer vehicles, while platoons having six or more vehicles travel at an established minimum platoon speed. The minimum platoon speed may be greater than $v_{min}$, however, as the vehicles travelling in a platoon need to retain the ability to reduce their speed somewhat during normal operations to accommodate for changes in a lead vehicle's speed that may occur during normal operations. For example, vehicles may be configured to maintain their speed above the $v_{min}$ of the roadway under normal driving conditions. If a platoon were travelling at $v_{min}$, however, and a lead vehicle happened to slow down (e.g., due to an obstacle in the roadway or for any other reason), the trailing vehicles may not be able to slow down any further (because it is already travelling at $v_{min}$ and is programmatically limited from further deceleration). Setting the minimum platoon speed above $v_{min}$ mitigates this issue by ensuring that the vehicles can slow down when they are in a platoon and will not be unsafely limited by the established minimum vehicle speed $v_{min}$.

The platooning scheme may also establish or define a maximum platoon size. For example, platoons may be limited to a maximum of ten vehicles, six vehicles, five vehicles, or any other suitable size. In some cases, the maximum platoon size may vary based on conditions and/or circumstances. For example, different segments of the roadway may have different maximum platoon sizes. As another example, changes in weather conditions may cause the transportation system to change the maximum platoon size. When a platoon size is larger than the maximum platoon size, the platoon may separate into multiple platoons each at or below the maximum platoon size. The vehicles may communicate between themselves to determine which vehicles should break away into a different platoon. Alternatively or additionally, a system controller may send instructions to the vehicles indicating which vehicles should break away into a different platoon. If a smaller (and thus faster) platoon catches up to a larger platoon that is already at the maximum platoon size, the smaller platoon may slow down to the speed of the leading platoon (and may maintain a certain separation distance between it and the larger platoon).

The platooning scheme may also define the target spacing (which may be used as a minimum spacing) between platoons (referred to as a target platoon spacing), as well as between vehicles in a platoon (referred to as a target vehicle spacing). The target vehicle spacing between vehicles in a platoon may be defined as a distance interval (e.g., 10 feet, 30 feet, or any other suitable value), or a time interval (e.g., one second, two seconds, three seconds, or any other suitable value). Using a time interval may help maximize the number of vehicles that may safely navigate the roadway at one time. The target platoon spacing may be defined as a certain multiple of the target spacing between vehicles in a platoon. For example, the target platoon spacing between platoons may be around 1.5 times the target vehicle spacing, 1.8 times the target vehicle spacing, 2.0 times the target vehicle spacing, 3.0 times the target vehicle spacing, or any other suitable value.

As noted above, vehicles operating according to the platooning scheme may communicate with one another to determine whether they should join a platoon or form a new platoon. For example, each vehicle may be configured to communicate with a vehicle that is directly ahead on the roadway. The vehicles may include wireless vehicle-to-vehicle communications systems to facilitate such communications, such as optical communications systems, radio-based communications systems, or the like. Vehicle-to-vehicle communications may be direct from one vehicle to another, or messages may be relayed through one or more other servers, computers, controllers, communications systems or providers, or the like.

Each vehicle may be configured to request information from the next vehicle about the number of vehicles ahead, and the queried vehicle may be configured to respond to such requests. For example, a trailing vehicle that is immediately behind a leading vehicle may query the leading vehicle about the number of vehicles that are ahead of the leading vehicle and that are separated from the next vehicle by a certain time interval (e.g., the target vehicle spacing). If the leading vehicle reports a number that is greater than the maximum platoon size, the trailing vehicle will reduce its speed to increase its distance to the leading vehicle. In some cases, the trailing vehicle will reduce its speed until it is at the target platoon spacing, and then attempt to maintain the spacing at the target platoon spacing until and unless the number of vehicles in the platoon ahead changes.

If a trailing vehicle receives from a leading vehicle a number that is greater than the maximum platoon size, it may immediately begin responding to any similar queries from further trailing vehicles by reporting the number zero (indicating that there are no cars immediately ahead and that is effectively a leader of a platoon). This may occur immediately after the trailing vehicle detects that it should start the new platoon, even if the trailing vehicle has not yet physically increased its separation distance to the platoon spacing. If the trailing vehicle did not report the number zero immediately upon determining that it is a new platoon leader, each further trailing vehicle may attempt to slow down at substantially the same time (each believing that there are too many vehicles immediately ahead of it), which would potentially cause unnecessary slowdowns or gaps in the system.

In some cases, instead of (or in addition to) queries being directed towards vehicles ahead, the queries may be directed to following or trailing vehicles. For example, instead of (or in addition to) a trailing vehicle querying a leading vehicle about the number of vehicles ahead, a leading vehicle may query the trailing vehicle(s) about the number of vehicles that are behind the leading vehicle and are separated by a certain time interval (e.g., the target vehicle spacing). Upon receiving one or more responses from the trailing vehicle(s), the lead vehicle may adjust its speed accordingly. For example, if a leading vehicle receives a response indicating that the number is greater than a maximum platoon size, the lead vehicle may adjust its speed (e.g., increasing its speed) in order to allow it (and optionally a number of following vehicles) to establish a new platoon.

Such communications may also be used to facilitate a leading vehicle to determine a speed at which to traverse the roadway. For example, as noted above, platoons may travel at different speeds based on the number of vehicles in a platoon. In such cases, the leading vehicle may adjust its speed based on the response(s) to the queries about the number of trailing vehicles. For example, if the number of trailing vehicles is less than the maximum platoon size, the leading vehicle may travel at a speed greater than the minimum platoon speed, and if the number of trailing vehicles is at the maximum platoon size, the leading vehicle may travel at the minimum platoon speed. The leading vehicle may respond to changes in the number of trailing vehicles by increasing or decreasing its speed in accordance with an equation that relates platoon size to platoon speed (as described above).

The vehicle control schemes described herein may be used with or by a transportation system in which numerous vehicles may be autonomously operated to transport passengers and/or freight along a roadway. For example, a transportation system or service may provide a fleet of vehicles that operate along the roadway. Vehicles in such a transportation system may be configured to operate autonomously, such as according to one or more vehicle schemes as described herein (e.g., a platooning scheme, a moving position-target scheme, etc.). As used herein, the term "autonomous" may refer to a mode or scheme in which vehicles can operate without continuous, manual control by a human operator. For example, driverless vehicles may navigate along a roadway using a system of automatic drive systems and steering systems that control the speed and direction of the vehicle. In some cases, the vehicles may not require steering, speed, or directional control from the passengers, and may exclude controls such as passenger-accessible accelerator and brake pedals, steering wheels, and other manual controls. In some cases, the vehicles may include manual drive controls that may be used for maintenance, emergency overrides, or the like. Such controls may be hidden, stowed, or otherwise not directly accessible by a user during normal vehicle operation. For example, they may be designed to be accessed only by trained operators, maintenance personnel, or the like.

Autonomous operation need not exclude all human or manual operation of the vehicles or of the transportation system as a whole. For example, human operators may be able to intervene in the operation of a vehicle for safety, convenience, testing, or other purposes. Such intervention may be local to the vehicle, such as when a human driver takes controls of the vehicle, or remotely, such as when an operator sends commands to the vehicle via a remote control system. Similarly, some aspects of the vehicles may be controlled by passengers of the vehicles. For example, a passenger in a vehicle may select a target destination, a route, a speed, control the operation of the doors and/or windows, or the like. Accordingly, it will be understood that the terms "autonomous" and "autonomous operation" do not necessarily exclude all human intervention or operation of the individual vehicles or of the overall transportation system.

The vehicles in the transportation system may include various sensors, cameras, communications systems, processors, and/or other components or systems that help facilitate autonomous operation. For example, the vehicles may include a sensor array that detects magnets or other markers embedded in the roadway and which help the vehicle determine its location, position, and/or orientation on the roadway. The vehicles may also include wireless vehicle-to-vehicle communications systems, such as optical communications systems, that allow the vehicles to inform one another of operational parameters such as their braking status, the number of vehicles ahead in a platoon, acceleration status, their next maneuver (e.g., right turn, left turn, planned stop), their number or type of payload (e.g., humans or freight), or the like. The vehicles may also include wireless communications systems to facilitate communication with a transportation system controller that has supervisory command and control authority over the transportation system.

The vehicles in the transportation system may be designed to enhance the operation and convenience of the transportation system. For example, a primary purpose of the transportation system may be to provide comfortable, convenient, rapid, and efficient personal transportation. To provide personal comfort, the vehicles may be designed for easy passenger ingress and egress, and may have comfortable seating arrangements with generous legroom and headroom. The vehicles may also have a sophisticated suspension system that provides a comfortable ride and dynamically adjustable parameters to help keep the vehicle level, positioned at a convenient height, and to ensure a comfortable ride throughout a range of variable load weights.

Conventional personal automobiles are designed for operation primarily in only one direction. This is due in part to the fact that drivers are oriented forwards, and operating in reverse for long distances is generally not safe or necessary. However, in autonomous vehicles, where humans are not directly controlling the operation of the vehicle in real-time, it may be advantageous for a vehicle to be able to operate bidirectionally. For example, the vehicles in a transportation system as described herein may be substantially symmetrical, such that the vehicles lack a visually or mechanically distinct front or back. Further, the wheels may be controlled sufficiently independently so that the vehicle may operate substantially identically no matter which end of the vehicle is facing the direction of travel. This symmetrical design provides several advantages. For example, the vehicle may be able to maneuver in smaller spaces by potentially eliminating the need to make U-turns or other maneuvers to re-orient the vehicles so that they are facing "forward" before initiating a journey.

Figure 7A:
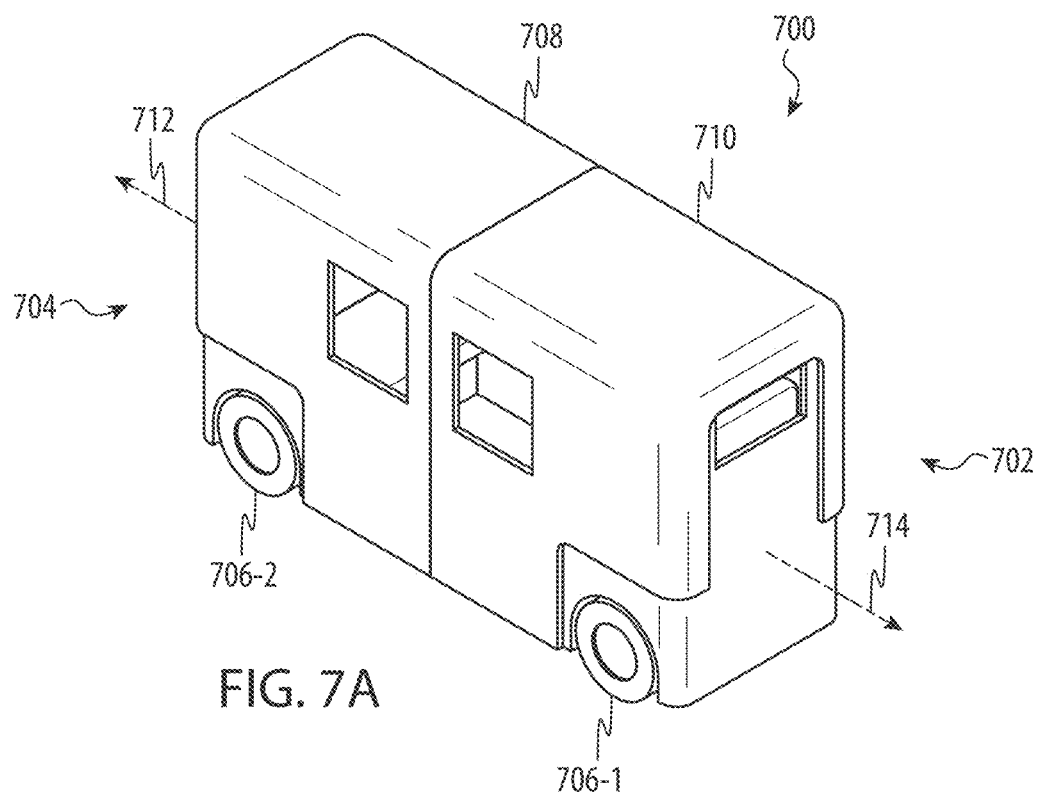
FIGS. 7A-7B depict an example vehicle.
Figure 7B:
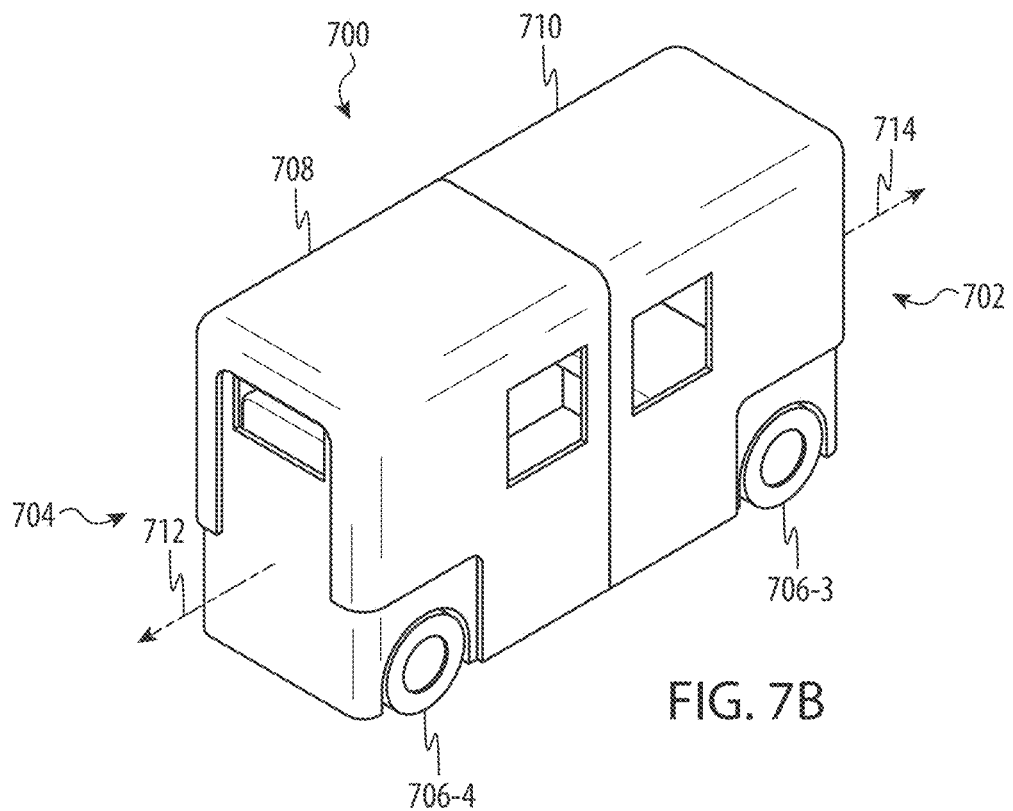

FIGS. 7A and 7B are perspective views of an example four-wheeled roadway vehicle 700 (referred to herein simply as a "vehicle") that may be used in a transportation system as described herein. FIGS. 7A-7B illustrate the symmetry and bidirectionality of the vehicle 700. In particular, the vehicle 700 defines a first end 702, shown in the forefront in FIG. 7A, and a second end 704, shown in the forefront in FIG. 7B. In some examples and as shown, the first and second ends 702, 704 are substantially identical. Moreover, the vehicle 700 may be configured so that it can be driven with either end facing the direction of travel. For example, when the vehicle 700 is travelling in the direction indicated by arrow 714, the first end 702 is the leading end of the vehicle 700, while when the vehicle 700 is traveling in the direction indicated by arrow 712, the second end 704 is the leading end of the vehicle 700.

The vehicle 700 may also include wheels 706 (e.g., wheels 706-1-706-4). The wheels 706 may be paired according to their proximity to an end of the vehicle. Thus, wheels 706-1, 706-3 may be positioned proximate the first end 702 of the vehicle and may be referred to as a first pair of wheels 706, and the wheels 706-2, 706-4 may be positioned proximate the second end 704 of the vehicle and may be referred to as a second pair of wheels 706. Each pair of wheels may be driven by at least one motor (e.g., an electric motor, which may be a drive system or part of a drive system of the vehicle), and each pair of wheels may be able to steer the vehicle. Because each pair of wheels is capable of turning to steer the vehicle, the vehicle may have similar driving and handling characteristics regardless of the direction of travel. In some cases, the vehicle may be operated in a two-wheel steering mode, in which only one pair of wheels steers the vehicle 700 at a given time. In such cases, the particular pair of wheels that steers the vehicle 700 may change when the direction of travel changes. In other cases, the vehicle may be operated in a four-wheel steering mode, in which the wheels are operated in concert to steer the vehicle. In a four-wheel steering mode, the pairs of wheels may either turn in the same direction or in opposite directions, depending on the steering maneuver being performed and/or the speed of the vehicle.

The vehicle 700 may also include doors 708, 710 that open to allow passengers and other payloads (e.g., packages, luggage, freight) to be placed inside the vehicle 700. The doors 708, 710, which are described in greater detail herein, may extend over the top of the vehicle such that they each define two opposite side segments. For example, each door defines a side segment on a first side of the vehicle and another side segment on a second, opposite side of the vehicle. The doors also each define a roof segment that extends between the side segments and defines part of the roof (or top side) of the vehicle. In some cases, the doors 708, 710 resemble an upside-down "U" in cross-section and may be referred to as canopy doors. The side segments and the roof segment of the doors may be formed as a rigid structural unit, such that all of the components of the door (e.g., the side segments and the roof segment) move in concert with one another. In some cases, the doors 708, 710 include a unitary shell or door chassis that is formed from a monolithic structure. The unitary shell or door chassis may be formed from a composite sheet or structure including, for example, fiberglass, carbon composite, and/or other lightweight composite materials.

The vehicle 700 may also include a vehicle controller that controls the operations of the vehicle 700 and the vehicle's systems and/or subsystems. For example, the vehicle controller may control the vehicle's drive system (e.g., motor(s), motor controller(s), gearbox(es), transmission(s), etc.), steering system, suspension system, doors, and the like, to facilitate vehicle operation, including to navigate the vehicle along a roadway in accordance with one or more vehicle control schemes. The vehicle controller may also be configured to communicate with other vehicles, the transportation system controller, vehicle presence detectors, or other components of the transportation system. For example, the vehicle controller may be configured to receive information from other vehicles about those vehicles' position in a platoon, speed, upcoming speed or direction changes, or the like. The vehicle controller may also be configured to receive information from vehicle presence detectors about available vehicle positions. The vehicle controller may include computers, processors, memory, circuitry, or any other suitable hardware components, and may be interconnected with other systems of the vehicle to facilitate the operations described herein, as well as other vehicle operations.

Figure 8A:
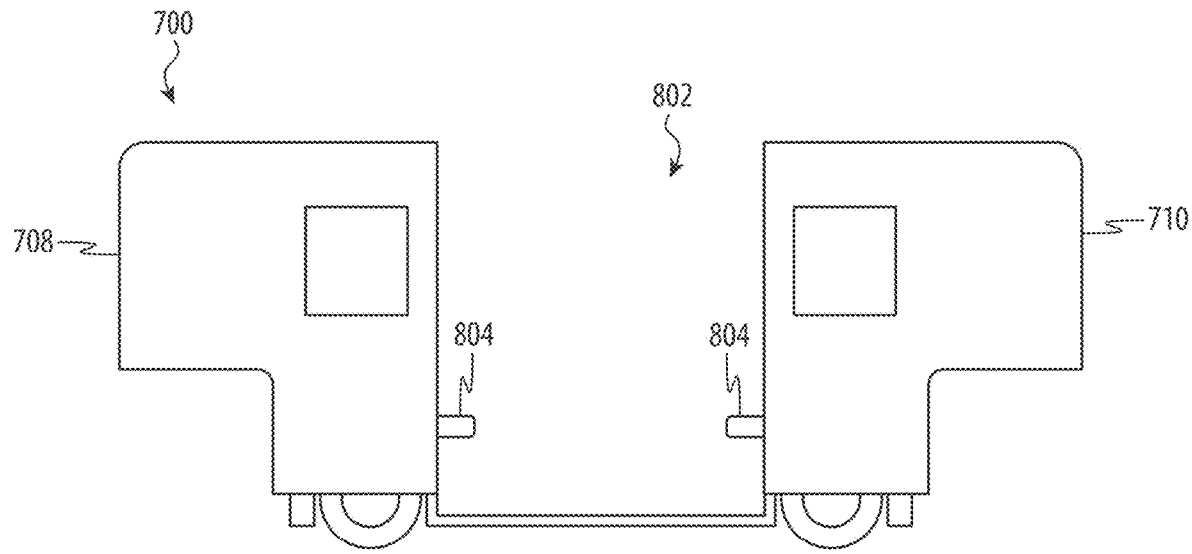
FIGS. 8A-8B depict the vehicle of FIGS. 7A-7B with its doors open.
Figure 8B:
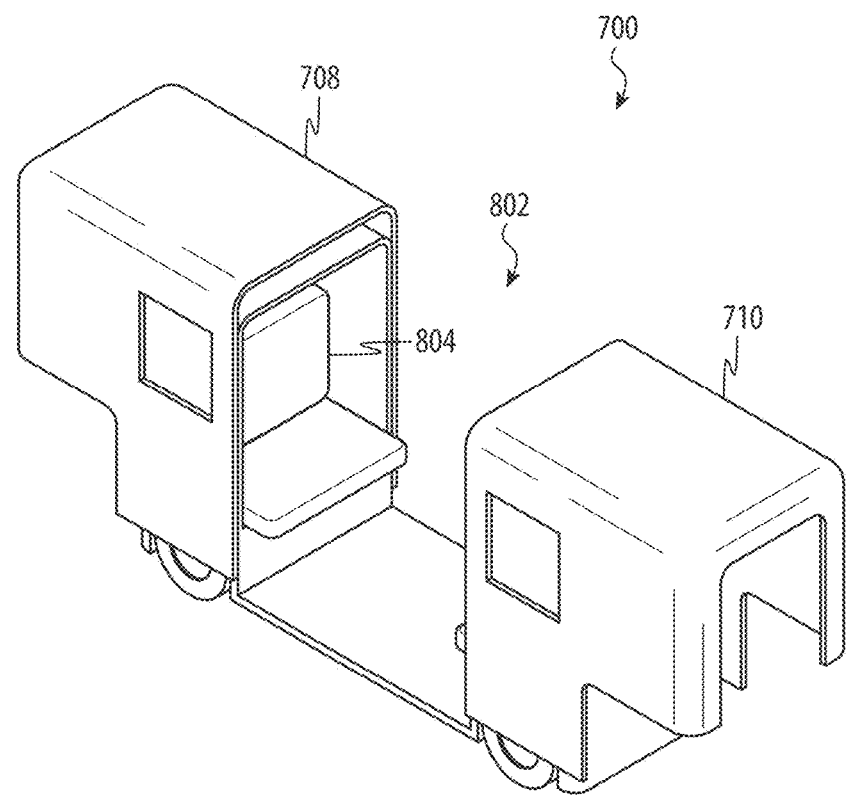

FIGS. 8A and 8B are side and perspective views of the vehicle 700 with the doors 708, 710 in an open state. Because the doors 708, 710 each define two opposite side segments and a roof segment, an uninterrupted internal space 802 may be revealed when the doors 708, 710 are opened. In the example depicted in FIGS. 8A and 8B, when the doors 708, 710 are opened, an open section may be defined between the doors 708, 710 that extends from one side of the vehicle 700 to the other. This may allow for unimpeded ingress and egress into the vehicle 700 by passengers on either side of the vehicle 700. The lack of an overhead structure when the doors 708, 710 are opened may allow passengers to walk across the vehicle 700 without a limit on the overhead clearance.

The vehicle 700 may also include seats 804, which may be positioned at opposite ends of the vehicle 700 and may be facing one another. As shown, the vehicle includes two seats 804, though other numbers of seats and other arrangements of seats are also possible (e.g., zero seats, one seat, three seats, etc.). In some cases, the seats 804 may be removed, collapsed, or stowed so that wheelchairs, strollers, bicycles, or luggage may be more easily placed in the vehicle 700.

Figure 9:
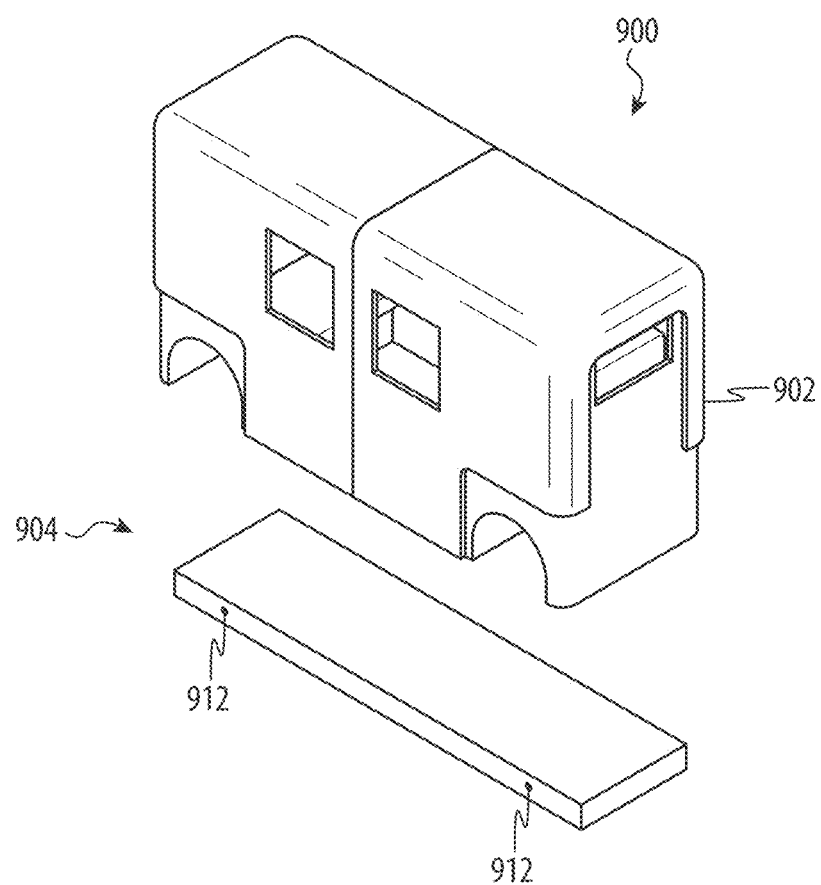
FIG. 9 depicts a partial exploded view of an example vehicle.

Vehicles for use in a transportation system as described herein, such as the vehicle 700, may be designed for safe and comfortable operation, as well as for ease of manufacture and maintenance. To achieve these advantages, the vehicles may be designed to have a frame structure that includes many of the structural and operational components of the vehicle (e.g., the motor, suspension, batteries, etc.) and that is positioned low to the ground. A body structure may be attached or secured to the frame structure. FIG. 9 illustrates a partial exploded view of a vehicle, which may be an embodiment of the vehicle 700, showing an example configuration of a frame structure and body structure. As described below, the low position of the frame structure combined with the relatively lightweight body structure produces a vehicle with a very low center of gravity, which increases the safety and handling of the vehicle. For example, a low center of gravity reduces the rollover risk of the vehicle when the vehicle encounters slanted road surfaces, wind loading, sharp turns, or the like, and also reduces body roll of the vehicle during turning or other maneuvers. Further, by positioning many of the operational components of the vehicle, such as motors, batteries, a vehicle controller, sensors (e.g., sensors that detect road-mounted magnets or other markers), and the like, on the frame structure (e.g., the frame structure 904, FIG. 9), manufacture and repair may be simplified.

FIG. 9 is a partial exploded view of a vehicle 900, which may be an embodiment of the vehicle 700. Details of the vehicle 700 may be equally applicable to the vehicle 900, and will not be repeated here. The vehicle 900 may include a body structure 902, which may include doors (e.g., the doors 708, 710, described above) and other body components, and a frame structure 904 to which the body structure 902 is attached.

The frame structure 904 may include drive, suspension, and steering components of the vehicle. For example, the frame structure 904 may include wheel suspension systems (which may define or include wheel mounts, axles, or hubs, represented in FIG. 9 as points 912), steering systems, drive motors, and optionally motor controllers. Wheels may be mounted to the wheel suspension systems via the wheel mounts, axles, hubs, or the like. The drive motors may include one or more drive motors that drive the wheels, either independently or in concert with one another. The drive motors may receive power from a power source (e.g., battery) that is mounted on the frame structure 904. Motor controllers for the drive motors may also be mounted on the frame structure 904.

The suspension systems may be any suitable type of suspension system. In some cases, the suspension systems include independent suspension systems for each wheel. For example, the suspension systems may be double-wishbone torsion-bar suspension systems. The suspension systems may also be dynamically adjustable, such as to control the ride height, suspension preload, damping, or other suspension parameters while the vehicle is stationary or while it is moving. Other suspension systems are also contemplated, such as swing axle suspension, sliding pillar suspension, MacPherson strut suspension, or the like. Moreover, spring and damping functions may be provided by any suitable component or system, such as coil springs, leaf springs, pneumatic springs, hydropneumatic springs, magneto-rheological shock absorbers, and the like. The suspension systems may be configured to operate in conjunction with the contour of a road surface (e.g., of a roadway as described above) to maintain a desired experience for a passenger.

The frame structure 904 may also include steering systems that allow the wheels to be turned to steer the vehicle. In some cases the wheels may be independently steerable, or they may be linked (e.g., via a steering rack) so that they always point in substantially the same direction during normal operation of the vehicle. Further, this allows the vehicles to use four-wheel steering schemes, as well as to alternate between two-wheel steering and four-wheel steering schemes.

The frame structure 904 may include components such as batteries, motors, and mechanisms for opening and closing the vehicle's doors, control systems (including computers or other processing units), and the like.

FIG. 9 illustrates example configurations of vehicles and frame structures. Other configurations are also possible, however. Moreover, the frame structure and the body structure shown in FIG. 9 are intended more as schematic representations of these components, and these components may include other structures that are omitted from FIG. 9 for clarity. Additional structural connections and integrations may be made between the body structure and the frame structure than are explicitly represented in FIG. 9. For example, components of a door mechanism that open and close the doors of the body structure may be joined to both the doors and to the frame structure.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments. Further, while the term "roadway" is used herein to refer to structures that support moving vehicles, the roadway described herein does not necessarily conform to any definition, standard, or requirement that may be associated with the term "roadway," such as may be used in laws, regulations, transportation codes, or the like. As such, the roadway described herein is not necessarily required to (and indeed may not) provide the same features and/or structures of a conventional "roadway." Of course, the roadways described herein may comply with any and all applicable laws, safety regulations, or other rules for the safety of passengers, bystanders, operators, builders, maintenance personnel, or the like.

What is claimed is:

1. A method of navigating a plurality of vehicles along a roadway, comprising:
   at a vehicle:
   navigating along a first segment of a roadway according to a first vehicle control scheme; and
   in response to crossing a boundary between the first segment of the roadway and a second segment of the roadway, transitioning from navigating according to the first vehicle control scheme to navigating according to a second vehicle control scheme different from the first vehicle control scheme, the second vehicle control scheme corresponding to a moving position-target vehicle control scheme, wherein
   transitioning from navigating according to the first vehicle control scheme to navigating according to the second vehicle control scheme comprises:
   selecting, from a plurality of candidate tracking functions, a tracking function that is associated with a time at which the vehicle will enter the second segment of the roadway; and
   in response to crossing the boundary, causing the vehicle to follow a moving position-target defined by the selected tracking function.

2. The method of claim 1, wherein the first vehicle control scheme is a platooning vehicle control scheme in which the vehicle is configured to change its speed in response to detecting a change in a speed of a downstream vehicle.

3. The method of claim 1, wherein:
   the plurality of candidate tracking functions is stored at the vehicle; and
   the operation of selecting the tracking function is performed by a vehicle controller of the vehicle.

4. The method of claim 1, wherein the operation of selecting the tracking function is performed by a transportation system controller.

5. The method of claim 4, wherein the transportation system controller transmits the tracking function to the vehicle.

6. The method of claim 1, wherein:
   the vehicle is a first vehicle; and
   the method further comprises:
   determining whether a second vehicle is positioned between the first vehicle and the boundary; and
   in accordance with a determination that a second vehicle is positioned between the first vehicle and the boundary, stopping the first vehicle before the boundary until the second vehicle has entered the second segment of the roadway.

7. The method of claim 1, wherein:
   the moving position-target vehicle control scheme is a first moving position-target vehicle control scheme;
   the first vehicle control scheme corresponds to a second moving position-target vehicle control scheme different than the first moving position-target vehicle control scheme; and
   a first vehicle flow rate defined by the first moving position-target vehicle control scheme is the same as a second vehicle flow rate defined by the second moving position-target vehicle control scheme.

8. A transportation system comprising a plurality of vehicles configured to autonomously navigate along a roadway, comprising:
   a vehicle configured to:
   navigate along a first segment of a roadway according to a first vehicle control scheme; and
   in response to crossing a boundary between the first segment of the roadway and a second segment of the roadway, transition from navigating according to the first vehicle control scheme to navigating according to a second vehicle control scheme different from the first vehicle control scheme, the second vehicle control scheme corresponding to a moving position-target vehicle control scheme, wherein
   transitioning from navigating according to the first vehicle control scheme to navigating according to the second vehicle control scheme comprises:
   selecting, from a plurality of candidate tracking functions, a tracking function that is associated with a time at which the vehicle will enter the second segment of the roadway; and
   in response to crossing the boundary, causing the vehicle to follow a moving position-target defined by the selected tracking function.

9. The transportation system of claim 8, wherein the first vehicle control scheme is a platooning vehicle control scheme in which the vehicle is configured to change its speed in response to detecting a change in a speed of a downstream vehicle.

10. The transportation system of claim 8, wherein:
    the vehicle comprises:
    a drive system configured to propel the vehicle;
    a steering system configured to steer the vehicle; and
    a vehicle position controller configured to control the steering system and the drive system to maintain the vehicle at the moving position-target defined by the selected tracking function.

11. The transportation system of claim 8, wherein:
    the plurality of candidate tracking functions is stored at the vehicle; and
    the operation of selecting the tracking function is performed by a vehicle controller of the vehicle.

12. The transportation system of claim 8, wherein:
    the operation of selecting the tracking function is performed by a transportation system controller; and
    the transportation system controller transmits the tracking function to the vehicle.

13. The transportation system of claim 8, further comprising a detectable component positioned at the boundary and detectable by the vehicle.

14. The transportation system of claim 13, wherein the vehicle begins navigating according to the second vehicle control scheme in response to detecting the detectable component.

15. A method of navigating a plurality of vehicles along a roadway, comprising:
at a transportation system controller:
detecting that a vehicle is approaching a boundary between a first segment of a roadway that is associated with a first vehicle control scheme and a second segment of the roadway that is associated with a second vehicle control scheme different from the first vehicle control scheme, the second vehicle control scheme corresponding to a moving position-target vehicle control scheme;
in response to detecting that the vehicle is approaching the boundary, selecting, from a plurality of candidate tracking functions, a tracking function that is associated with a time at which the vehicle will enter the second segment of the roadway; and
sending the tracking function to the vehicle, wherein the vehicle is configured to follow a moving-position target defined by the selected tracking function when the vehicle enters the second segment of the roadway.

16. The method of claim 15, further comprising, at the vehicle:
receiving the tracking function;
detecting that the vehicle has entered the second segment of the roadway; and
in response to detecting that the vehicle has entered the second segment of the roadway, beginning to follow the moving-position target defined by the selected tracking function.

17. The method of claim 15, wherein the first vehicle control scheme is a platooning vehicle control scheme in which the vehicle is configured to change its speed in response to detecting a change in a speed of a downstream vehicle.

18. The method of claim 15, wherein:
the moving position-target vehicle control scheme is a first moving position-target vehicle control scheme; and
the first vehicle control scheme corresponds to a second moving position-target vehicle control scheme different than the first moving position-target vehicle control scheme.

19. The method of claim 15, further comprising:
at the transportation system controller:
in response to a change in at least one of a weather condition, a roadway condition, or a traffic condition, selecting a modified tracking function for the vehicle; and
sending the modified tracking function to the vehicle; and
at the vehicle, in response to receiving the modified tracking function, transition from following the moving-position target defined by the selected tracking function to following a new moving-position target defined by the modified tracking function.

20. The method of claim 19, wherein the vehicle detects the change in the at least one of the weather condition, the roadway condition, or the traffic condition and transmits information about the detected change to the transportation system controller.

* * * * *